(12) United States Patent
Tsuji

(10) Patent No.: US 8,758,471 B2
(45) Date of Patent: Jun. 24, 2014

(54) MAT, METHOD FOR PRODUCING THE MAT, AND EXHAUST GAS PURIFYING APPARATUS

(75) Inventor: Hiromitsu Tsuji, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 345 days.

(21) Appl. No.: 13/105,838

(22) Filed: May 11, 2011

(65) Prior Publication Data

US 2011/0277432 A1    Nov. 17, 2011

(30) Foreign Application Priority Data

May 11, 2010    (JP) ................................. 2010-109614

(51) Int. Cl.
*B01D 39/20* (2006.01)

(52) U.S. Cl.
USPC ............ 55/523; 55/485; 55/DIG. 30; 60/311; 422/177; 442/273; 442/390; 442/391; 442/406; 442/410

(58) Field of Classification Search
USPC ............ 55/490–519, 522–528; 442/172–180, 442/332, 368, 402–407, 198, 210–216, 219, 442/273, 342–343, 390, 391, 410; 264/628; 428/119–120; 60/311; 422/177

See application file for complete search history.

(56) References Cited

U.S. PATENT DOCUMENTS

| | | | |
|---|---|---|---|
| 5,028,397 A | | 7/1991 | Merry |
| 5,454,845 A | * | 10/1995 | Anahara et al. ............... 55/482.1 |
| 2003/0207635 A1 | * | 11/2003 | Minemura et al. ............ 442/327 |
| 2004/0116028 A1 | * | 6/2004 | Bryner .......................... 442/381 |
| 2005/0183909 A1 | * | 8/2005 | Rau et al. ................. 188/218 XL |
| 2007/0254548 A1 | | 11/2007 | Meadows |

FOREIGN PATENT DOCUMENTS

| | | |
|---|---|---|
| CN | 101152774 | 4/2008 |
| CN | 101397928 | 4/2009 |
| CN | 101571066 | 11/2009 |
| CN | 101581245 | 11/2009 |
| EP | 1908934 | 4/2008 |
| EP | 2113642 | 11/2009 |
| EP | 2119886 | 11/2009 |
| JP | 59-519 | 1/1984 |
| JP | 62-56348 | 3/1987 |
| JP | 11-302955 | 11/1999 |

OTHER PUBLICATIONS

Extended European Search Report for corresponding EP Application No. 11164411.8-2321, Aug. 8, 2011.

* cited by examiner

*Primary Examiner* — Duane Smith
*Assistant Examiner* — Thomas McKenzie
(74) *Attorney, Agent, or Firm* — Ditthavong Mori & Steiner, P.C.

(57) ABSTRACT

A mat includes a first main face and a second main face opposite to the first main face. At least two layers include a first layer occupying a first area from the first main face along a thickness direction of the mat. The first layer includes a first long fibrous substance which includes an inorganic fibrous substance. A second layer is adjacent to the first layer. The second layer includes a short fibrous substance which includes an inorganic fibrous substance and which has an average fiber length shorter than an average fiber length of the first long fibrous substance. An intertwined portion extends from the first main face to the second main face. The intertwined portion includes the first long fibrous substance and the short fibrous substance being more closely intertwined with each other than the inorganic fibrous substances in a portion except the intertwined portion.

12 Claims, 8 Drawing Sheets

A-A line cross-sectional view

A-A line cross-sectional view

B-B line cross-sectional view

C-C line cross-sectional view

MAT, METHOD FOR PRODUCING THE MAT, AND EXHAUST GAS PURIFYING APPARATUS

CROSS-REFERENCE TO RELATED APPLICATIONS

The present application claims priority under 35 U.S.C. §119 to Japanese Patent Application No. 2010-109614, filed May 11, 2010, the contents of which are incorporated herein by reference in their entirety.

BACKGROUND OF THE INVENTION

1. Field of the Invention

The present invention relates to a mat, a method for producing the mat, and an exhaust gas purifying apparatus.

2. Discussion of the Background

Conventionally known mats include nonwoven fabric-like mats made from compressed inorganic fibrous materials such as fibrous silica or fibrous alumina. These mats are excellent in characteristics such as heat resistance and elasticity (repulsive force), and thus they are used for various applications.

For example, such a mat is used as a component of an exhaust gas purifying apparatus.

Specifically, a typical exhaust gas purifying apparatus includes a cylindrical exhaust gas treating body, a cylindrical casing which accommodates the exhaust gas treating body, and a mat-shaped holding sealing material disposed between the exhaust gas treating body and the casing, and the mat is used as a material for this holding sealing material. The holding sealing material is produced through steps such as a step of cutting a mat into a predetermined shape.

The holding sealing material which includes a nonwoven fabric-like mat having repulsive force has a predetermined holding force. Thus, in the exhaust gas purifying apparatus, the holding sealing material securely holds the exhaust gas treating body at a predetermined position inside the casing. Further, since the holding sealing material is disposed between the exhaust gas treating body and the casing, the exhaust gas treating body is less likely to be in contact with the casing even if vibration or the like is applied, and exhaust gas is less likely to leak from between the exhaust gas treating body and the casing.

The exhaust gas purifying apparatus including a holding sealing material may be produced by stuffing an exhaust gas treating body wrapped with a holding sealing material into a casing.

Specifically, a holding sealing material is wrapped around the periphery of a cylindrical exhaust gas treating body to prepare a wrapped member, and the wrapped member is slide-stuffed into a cylindrical casing whose inner diameter is smaller than the outer diameter of the wrapped member while the holding sealing material is compressed.

In this production method, therefore, the holding sealing material wrapped around the exhaust gas treating body is required to have an appropriately low volume so that the wrapped member is easily stuffed.

Further, a high shearing force is applied to the holding sealing material when the holding sealing material is stuffed into the casing. Thus, the holding sealing material is required to have a certain degree of strength (hereinafter, also referred to simply as shear strength) so as not to be torn due to the shearing force.

Furthermore, the holding sealing material is required to have a certain degree of flexibility so as not to suffer crackings when wrapped around the exhaust gas treating body.

JP-A 62-56348 discloses a conventional mat including fibrous alumina as a mat for such a holding sealing material.

This conventional mat is produced as follows: a fibrous alumina precursor, which is to be converted into an inorganic fibrous substance by firing, is compressed to prepare a sheet; multiple needles with barbs are inserted into/extracted from the sheet along the thickness direction of the sheet to prepare a needled sheet with intertwined portions formed therein; and the needled sheet is fired.

The produced mat is cut into a predetermined shape, and thereby a holding sealing material is produced.

JP-A 59-519 discloses a conventional mat produced by preparing a sheet-formed sheet including an inorganic fibrous substance, stacking a polyester-fiber nonwoven fabric on the upper face of the sheet, and needling the sheet in a manner as mentioned above.

The produced mat is cut into a predetermined shape, and thereby a holding sealing material is produced.

The contents of JP-A 62-56348 and JP-A 59-519 are incorporated herein by reference in their entirety.

SUMMARY OF THE INVENTION

According to one aspect of the present invention, a mat includes a first main face, a second main face, at least two layers, and an intertwined portion. The second main face is opposite to the first main face. The at least two layers include a first layer and a second layer. The first layer occupies a first area from the first main face along a thickness direction of the mat. The first layer includes a first long fibrous substance which includes an inorganic fibrous substance. The second layer is adjacent to the first layer. The second layer includes a short fibrous substance which includes an inorganic fibrous substance and which has an average fiber length shorter than an average fiber length of the first long fibrous substance. The intertwined portion extends from the first main face to the second main face. The intertwined portion includes the first long fibrous substance and the short fibrous substance being more closely intertwined with each other than the inorganic fibrous substances in a portion except the intertwined portion.

According to another aspect of the present invention, a method for producing a mat includes preparing a sheet having a first main face and a second main face opposite to the first main face. The sheet includes inorganic fibrous substance precursors. The inorganic fibrous substance precursors are intertwined with each other and are designed to be inorganic fibrous substances after a following firing. The sheet includes at least two sub-sheets. The at least two sub-sheets include a first sub-sheet and a second sub-sheet. The first sub-sheet occupies a first area from the first main face along a thickness direction of the mat. The first sub-sheet includes a first long fibrous substance precursor which includes one of the inorganic fibrous substance precursors. The second sub-sheet is adjacent to the first sub-sheet. The second sub-sheet includes a short fibrous substance precursor which includes one of the inorganic fibrous substance precursors and which has an average fiber length shorter than an average fiber length of the first long fibrous substance precursor. The sheet is needled by passing needles through the sheet from the first main face to the second main face to prepare a needled sheet. The needled sheet is fired.

According to further aspect of the present invention, an exhaust gas purifying apparatus includes an exhaust gas treating body, a casing, and a holding sealing material. The casing accommodates the exhaust gas treating body. The holding sealing material is disposed between the exhaust gas treating body and the casing and holds the exhaust gas treating body. The holding sealing material includes the above-mentioned mat.

According to the other aspect of the present invention, an exhaust gas purifying apparatus includes an exhaust gas treating body, a casing, and a holding sealing material. The casing accommodates the exhaust gas treating body. The holding sealing material is disposed between the exhaust gas treating body and the casing and holds the exhaust gas treating body. The holding sealing material includes a mat produced by the above-mentioned method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
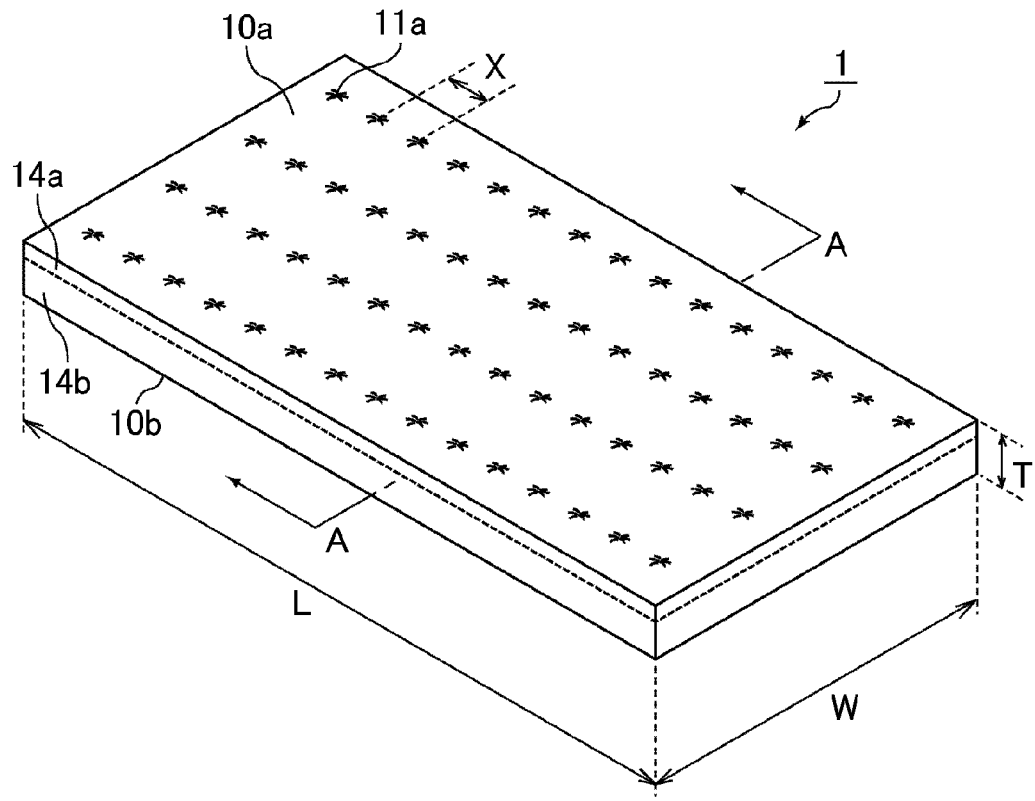
FIG. 1A is a perspective view schematically showing a mat according to an embodiment of the present invention.

The embodiments will now be described with reference to the accompanying drawings, wherein like reference numerals designate corresponding or identical elements throughout the various drawings.

The conventional mat disclosed in JP-A 62-56348 includes fibrous alumina having a long average fiber length (long fibrous alumina). Thus, the long fibrous alumina is complexly intertwined around the intertwined portions formed along the thickness direction of the mat, and the mat is considered to have high shear strength and an appropriately low volume.

In the production of the conventional mat disclosed in JP-A 62-56348, the fibrous alumina precursor is prepared by the blowing method.

In general, however, preparation of a fibrous alumina precursor having a long average fiber length by the blowing method costs higher than preparation of a fibrous alumina precursor having a short average fiber length, in many cases.

Under such situations, the present inventors have produced a mat for studies by the steps of: compressing an inorganic fibrous substance precursor which is produced at low cost and which has a short average fiber length to provide a sheet; needling the prepared sheet to provide a needled sheet; and firing the obtained needled sheet.

In the mat including the fired needled sheet, however, the inorganic fibrous substance is not sufficiently intertwined even by the needling of the sheet including the inorganic fibrous substance precursor having a short average fiber length. This is probably because the fiber length is so short that the inorganic fibrous substance precursor is not sufficiently intertwined. Thus, the mat has low shear strength, and the volume thereof is not sufficiently low.

Further, the mat has low flexibility because it includes a low-flexible short fibrous substance.

In the mat disclosed in JP-A 59-519, the inorganic fibrous substance having a long average fiber length, which constitutes a sheet-formed sheet, and the fibrous polyester, which constitutes a fibrous polyester nonwoven fabric, are intertwined around the intertwined portions formed along the thickness direction of the mat. Thus, the mat presumably has high shear strength and an appropriately low volume even though it is free from an organic binder.

The present inventor has found out that it may become easier to increase the shear strength of a mat including inorganic fibrous substances intertwined with each other and having a first main face and a second main face opposite to the first main face by forming a first layer which has the first main face from a long fibrous substance, forming a layer other than the first layer from a short fibrous substance, and forming an intertwined portion where the long fibrous substance and the short fibrous substance are closely intertwined with each other from the first main face to the second main face. Further, the present inventor has found out that it may become easier to appropriately reduce the volume, to provide good flexibility, and to provide good handleability upon wrapping.

Furthermore, the present inventor has found out that the mat does not require use of an organic material such as fibrous polyester nonwoven fabric as its component, and that the mat can sufficiently endure high-temperature applications.

Moreover, the present inventor has found that the mat tends to be produced at low cost by reducing the amount of the long fibrous substance which is produced at high cost.

The mat according to one embodiment of the present invention includes:
a first main face,
a second main face opposite to the first main face,
at least two layers including:
a first layer occupying a certain area from the first main face along a thickness direction of the mat, the first layer including a first long fibrous substance which includes an inorganic fibrous substance, and a second layer adjacent to the first layer, the second layer including a short fibrous substance which includes an inorganic fibrous substance and which has an average fiber length shorter than an average fiber length of the first long fibrous substance, and an intertwined portion extending from the first main face to the second main face, the intertwined portion including the first long fibrous substance and the short fibrous substance being more closely intertwined with each other than the inorganic fibrous substances in a portion except the intertwined portion.

The mat according to the embodiment of the present invention has an intertwined portion disposed from the first main face to the second main face. The intertwined portion includes the first long fibrous substance and the short fibrous substance more closely intertwined with each other than inorganic fibrous substances in a portion other than the intertwined portion. Thus, the mat tends to have higher shear strength and appropriately lower volume than a mat without an intertwined portion.

Further, the first layer includes the first long fibrous substance which is flexible and which has a long average fiber length, and the mat is not formed on the whole from a less flexible short fibrous substance having a short average fiber length. Thus, the mat tends to have high flexibility.

Furthermore, the second layer includes the short fibrous substance which has a short average fiber length and which is appropriately intertwined so that it is less likely to cause a high-density portion. Thus, the density of the inorganic fibrous substance in the second layer is less likely to be varied. Therefore, the density of the inorganic fibrous substances (the first long fibrous substance and the short fibrous substance) tends to be less varied in the whole mat, while the first layer includes the first long fibrous substance which has a long average fiber length and which is likely to form a high-density portion and the density of the inorganic fibrous substance in the first layer is greatly varied.

Therefore, the mat according to the embodiment of the present invention is likely to be uniformly bent. In addition, a holding sealing material including the mat is excellent in handleability upon wrapping, and is less likely to suffer creases upon stuffing.

The inorganic fibrous substances constituting the mat include the short fibrous substance whose production cost is low in addition to the first long fibrous substance whose production cost is high. Thus, the production cost of the mat tends to be kept low.

Moreover, main components of the mat include no organic materials. Thus, the mat tends to sufficiently endure high-temperature applications.

The following will specifically describe the structural characteristics and the effects of the mat according to the embodiment of the present invention referring to the drawings.

Figure 1B:
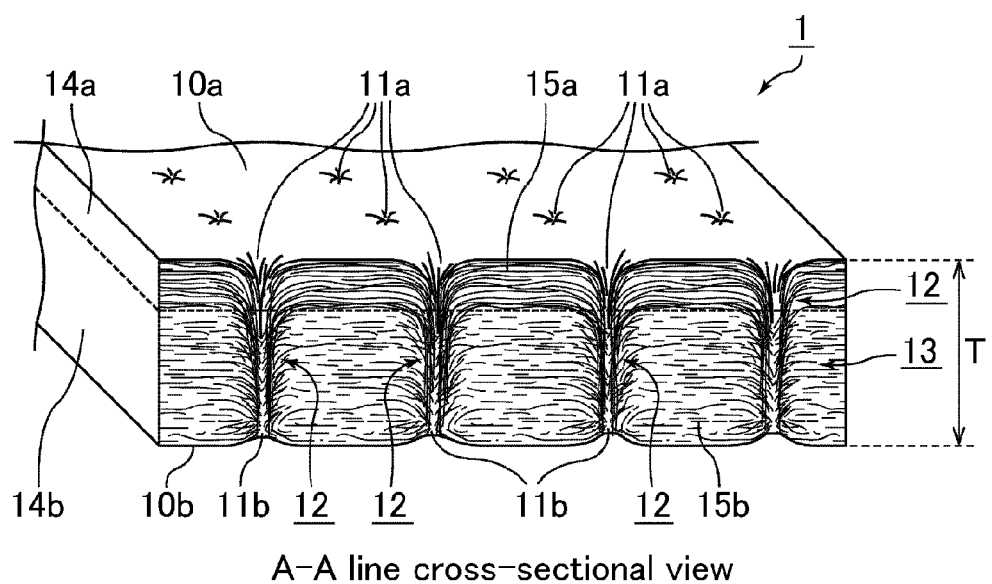
FIG. 1B is an A-A line cross-sectional view of the mat shown in FIG. 1A.

FIG. 1A is a perspective view schematically showing a mat according to the embodiment of the present invention; and FIG. 1B is an A-A line cross-sectional view of the mat shown in FIG. 1A.

A mat 1 according to the embodiment of the present invention shown in FIG. 1A has a rectangular shape in a plan view and is a flat-shaped plate with a predetermined thickness.

The following will specifically describe the internal structure of the mat 1 according to the embodiment of the present invention; other structural characteristics of the mat 1 will be mentioned in the following first embodiment of the present invention.

As shown in FIG. 1A and FIG. 1B, the mat 1 according to the embodiment of the present invention has one main face (hereinafter, also referred to as the first main face) 10a and the other main face (hereinafter, referred to as the second main face) 10b opposite to the first main face 10a.

The mat 1 includes a first layer 14a which has the first main face 10a and which occupies a certain area from the first main face 10a along the thickness direction of the mat 1 (the thickness of the mat is indicated by a double-head arrow T in FIG. 1A and FIG. 1B) and a second layer 14b which is adjacent to the first layer 14a, which has the second main face 10b, and which occupies a certain area from the second main face 10b along the thickness direction of the mat 1.

The mat according to the embodiment of the present invention may be a mat including at least two layers, and is not limited to the mat having only two layers as exemplified in FIG. 1A and FIG. 1B. For example, the first layer or the second layer may be divided into multiple layers; one or more layers where inorganic fibrous substances having various compositions, average fiber lengths, and average fiber diameters are intertwined with each other may be disposed between the first layer and the second layer; or these layers are adjacent to the second layer, resulting in three or more multilayer structure of the mat.

The mat 1 according to the embodiment of the present invention includes various intertwined inorganic fibrous substances with different compositions of inorganic fibrous materials, such as fibrous silica, fibrous alumina-silica, and fibrous alumina.

The first layer 14a includes a first long fibrous substance 15a, and the second layer 14b includes a short fibrous substance 15b having an average fiber length shorter than the average fiber length of the first long fibrous substance 15a.

The first long fibrous substance 15a and the short fibrous substance 15b may have the same composition, or may have different compositions.

In the mat 1, the first layer 14a includes the first long fibrous substance 15a with high flexibility, and the mat 1 is made from not only the short fibrous substance 15b with low flexibility. Thus, the mat 1 tends to have high flexibility.

Further, the second layer 14b includes the short fibrous substance 15b which has a short average fiber length and which is less likely to form a high-density portion. Thus, the density of the inorganic fibrous substances in the whole mat 1 tends to be made equal and tends to be less varied even though the mat has the first layer 14a which includes the first long fibrous substance 15a and in which the density of the inorganic fibrous substance is slightly greatly varied. Therefore, the mat 1 is likely to be uniformly bent, and a holding sealing material including the mat 1 is excellent in handleability upon wrapping and is less likely to suffer creases upon stuffing.

In the mat 1, the second layer 14b includes the short fibrous substance 15b which is produced at low cost and the inorganic fibrous substances constituting the mat 1 include not only the first long fibrous substance 15a which is produced at high cost. Thus, the production cost of the mat 1 tends to be kept low.

Intertwined points (hereinafter, also referred to as the first intertwined points) 11a are formed on the first main face 10a, and other intertwined points (hereinafter, also referred to as the second intertwined points) 11b are formed on the second main face 10b. Further, intertwined portions 12 are continuously formed from the respective first intertwined points 11a to the corresponding second intertwined points 11b along the thickness direction of the mat 1.

Portions 13 other than the intertwined portions 12 (hereinafter, also referred to simply as the non-formation regions) include inorganic fibrous substances intertwined with each other in a relatively loose manner, and the mat shows a non-woven fabric-like state. Specifically, the first long fibrous substance 15a is loosely intertwined in the first layer 14a, while the short fibrous substance 15b is intertwined in a relatively loose manner in the second layer 14b.

On the other hand, the intertwined portions 12 include the first long fibrous substance 15a and the short fibrous substance 15b which are arranged in the direction toward the second main face 10b, and which are more closely intertwined with each other than the inorganic fibrous substances in the non-formation regions 13. Thus, the mat 1 tends to have higher shear strength than a mat with no intertwined portion 12.

Further, the mat 1 is in a state as if it were sewn along the thickness direction owing to the closely intertwined first long fibrous substance 15a and short fibrous substance 15b.

Thus, the mat 1 tends to have an appropriately low volume around the intertwined portions 12.

As a result, a holding sealing material prepared by steps such as cutting the produced mat 1 into a predetermined shape tends to have high shear strength and an appropriately low volume. Therefore, in the case of using the prepared holding sealing material in production of an exhaust gas purifying apparatus, the exhaust gas treating body wrapped with the holding sealing material is likely to be easily stuffed into a casing. Moreover, the holding sealing material is less likely to be damaged and tends to have an increased durability in the produced exhaust gas purifying apparatus.

In the mat according to the embodiment of the present invention, the average fiber length of the first long fibrous substance is preferably about two or more times as long as the thickness of the mat.

In the case that the average fiber length of the first long fibrous substance is about twice as long as the thickness of the mat, the first long fibrous substance has a sufficiently long average fiber length. Thus, the first long fibrous substance in each of the intertwined portions presumably extends from the first intertwined point to the second intertwined point. Particularly, in the case that the average fiber length of the first long fibrous substance is longer than about twice the thickness of the mat, most part of the first long fibrous substance which reaches the second intertwined point from the first intertwined point is presumably folded back at the second intertwined point, so that it is more complexly intertwined with the short fibrous substance.

As a result, the first long fibrous substance and the short fibrous substance tend to be more complexly intertwined with each other around the intertwined portions, and thus the mat tends to have higher shear strength.

Further, the first long fibrous substance and the short fibrous substance more complexly intertwined with each other cause the mat to be in a state as if it were securely sewn along the thickness direction. Thus, the volume of the mat tends to be securely kept low.

Furthermore, since the first long fibrous substance has a sufficiently long average fiber length, the mat tends to securely have good flexibility.

In the mat according to the embodiment of the present invention, the average fiber length of the first long fibrous substance is preferably not shorter than about 20 mm and not longer than about 100 mm, and the average fiber length of the short fibrous substance is preferably not shorter than about 3.5 mm and not longer than about 20 mm.

In the case that the first long fibrous substance has an average fiber length of not shorter than about 20 mm and not longer than about 100 mm and the short fibrous substance has an average fiber length of not shorter than about 3.5 mm and not longer than about 20 mm, the average fiber length of the first long fibrous substance and the average fiber length of the short fibrous substance are in good balance. Thus, the first long fibrous substance and the short fibrous substance tend to be intertwined with each other at a better degree around the intertwined portions, and the mat tends to have higher shear strength. In addition, the first long fibrous substance and the short fibrous substance cause the mat to be in a state as if it were securely sewn around the intertwined portions, so that the volume of the mat tends to be securely kept low.

Further, since the first long fibrous substance has a sufficiently long average fiber length, the mat tends to securely have good flexibility.

Furthermore, the mat also has the second layer including the short fibrous substance which has an average fiber length of not shorter than about 3.5 mm and not longer than about 20 mm and which is less likely to form a high-density portion. Thus, the density of the inorganic fibrous substances is made equal and tends to be kept low in the whole mat even though the mat has the first layer including the inorganic fibrous substances with the density greatly varied.

As a result, the mat is more likely to be uniformly bent, and a holding sealing material including this mat is excellent in handleability upon wrapping and is less likely to suffer creases upon stuffing.

Further, in general, the short fibrous substance having the aforementioned average fiber length is produced at sufficiently lower cost than the first long fibrous substance in many cases. Therefore, the production cost of the mat tends to be securely kept low.

Since the short fibrous substance has a shorter average fiber length than the first long fibrous substance, the mat of the present invention excludes a mat in which both the average fiber length of the first long fibrous substance and the average fiber length of the short fibrous substance are 20 mm.

In the mat according to the embodiment of the present invention, a ratio between a thickness of the first layer and a thickness of the second layer is preferably from about 1:1 to about 1:10. In other words, the following relationship is preferably satisfied:

Thickness of first layer:thickness of second layer=from about 1:1 to about 1:10.

A ratio between the thickness of the first layer and the thickness of the second layer of from about 1:1 to about 1:10 does not cause an insufficient amount of the first long fibrous substance. Thus, increased shear strength, an appropriately low volume, and good flexibility of the mat tend to be securely achieved.

In addition, such a ratio does not cause an insufficient amount of the short fibrous substance. Thus, the density of the inorganic fibrous substances tends to be less varied in the whole mat.

Further, the amount of the first long fibrous substance in the whole mat is limited to a requisite minimum, and the production cost tends to be securely lowered.

On the other hand, if the first layer is thinner than the maximum thickness of the first layer in the above ratio (thickness of first layer:thickness of second layer=about 1:1), the amount of the short fibrous substance in the mat is not so small that the density of the inorganic fibrous substances is less likely to be greatly varied in the whole mat. As a result, the mat is less likely to show poor handleability upon wrapping, and is less likely to suffer creases upon stuffing. In addition, the production cost of the mat is less likely to be high.

If the first layer is thicker than the minimum thickness of the first layer in the above ratio (thickness of first layer: thickness of second layer=about 1:10), the amount of the first long fibrous substance in the mat is not so small that the mat is less likely to have low shear strength. In addition, the volume of the mat is likely to be low and the flexibility thereof is less likely to be low.

The mat according to the embodiment of the present invention has a third layer occupying a certain area from the second main face along the thickness direction of the mat. The third layer includes a second long fibrous substance including an inorganic fibrous substance and having an average fiber length longer than the average fiber length of the short fibrous substance. The intertwined portion may include the first long fibrous substance, the short fibrous substance, and the second long fibrous substance which are more closely intertwined with each other than inorganic fibrous substances in a portion other than the intertwined portion.

The mat having such a structure also tends to suitably achieve the aforementioned effects of the mat according to the embodiment of the present invention.

The specific structure of this mat will be mentioned in the following second embodiment of the present invention.

The mat according to the embodiment of the present invention may be a mat including at least three layers, and is not limited to the mat consisting of only three layers as exemplified in FIG. 8A and FIG. 8B in the following second embodiment of the present invention. For example, the first layer, the second layer, or the third layer may be divided into multiple layers; or one or more layers including inorganic fibrous substances with various compositions, average fiber lengths, and average fiber diameters intertwined with each other are disposed between the first layer and the second layer or between the second layer and the third layer, and thereby the mat may have three or more multi-layer structure.

In the mat according to the embodiment of the present invention, the intertwined portion preferably includes a first intertwined portion and a second intertwined portion. The first intertwined portion preferably includes the first long fibrous substance, the short fibrous substance, and the second long fibrous substance which are arranged in the direction from the first main face to the second main face and which are preferably closely intertwined with each other. The second intertwined portion preferably includes the first long fibrous substance, the short fibrous substance, and the second long fibrous substance which are arranged in the direction from the second main face to the first main face and which are preferably closely intertwined with each other.

In the mat having such a structure, the arranged direction of the first long fibrous substance, the short fibrous substance, and the second long fibrous substance in the first intertwined portion, and the arranged direction of the first long fibrous substance, the short fibrous substance, and the second long fibrous substance in the second intertwined portion are opposite to each other. Thus, the inorganic fibrous substances are more complexly intertwined with each other around the first intertwined portions and the second intertwined portions. As a result, the mat tends to securely have higher shear strength and an appropriately low volume.

In the mat according to the embodiment of the present invention, the average fiber lengths of the first long fibrous substance and the second long fibrous substance each are preferably about two or more times as long as the thickness of the mat.

In such a case, the first long fibrous substance has a sufficiently long average fiber length, and thus the first long fibrous substance in the first intertwined portions presumably reaches the second main face from the first main face. Particularly in the case that the average fiber length of the first long fibrous substance is longer than about twice the thickness of the mat, most part of the first long fibrous substance reaching the second main face from the first main face is presumably folded back at the second main face, and thus tends to be more complexly intertwined with the short fibrous substance and the second long fibrous substance.

Further, the second long fibrous substance has a sufficiently long average fiber length, and thus the second long fibrous substance in the second intertwined portions presumably reaches the first main face from the second main face. Particularly in the case that the average fiber length of the second long fibrous substance is longer than about twice the thickness of the mat, most part of the second long fibrous substance reaching the first main face from the second main face is presumably folded back at the first main face, and thus tends to be more complexly intertwined with the short fibrous substance and the first long fibrous substance.

Therefore, in the mat having such a structure, the first long fibrous substance, the short fibrous substance, and the second long fibrous substance are intertwined with each other at a better degree around the intertwined portions, and thus the mat tends to have higher shear strength.

Further, the first long fibrous substance, the short fibrous substance, and the second long fibrous substance more complexly intertwined with each other cause the mat to be in a state as if it were securely sewn along the thickness direction. Thus, the mat tends to securely have a low volume.

Furthermore, the first long fibrous substance and the second long fibrous substance each have a sufficiently long average fiber length. Thus, the mat tends to securely have good flexibility.

In the mat according to the embodiment of the present invention, the average fiber length of the first long fibrous substance is preferably not shorter than about 20 mm and not longer than about 100 mm; the average fiber length of the short fibrous substance is preferably not shorter than about 3.5 mm and not longer than about 20 mm; and the average fiber length of the second long fibrous substance is preferably not shorter than about 20 mm and not longer than about 100 mm.

In the case that the average fiber lengths of the first long fibrous substance and the second long fibrous substance each are not shorter than about 20 mm and not longer than about 100 mm and the average fiber length of the short fibrous substance is not shorter than about 3.5 mm and not longer than about 20 mm, the average fiber lengths of the first long fibrous substance and the second long fibrous substance and the average fiber length of the short fibrous substance are in good balance. Thus, the first long fibrous substance, the short fibrous substance, and the second long fibrous substance tend to be intertwined with each other at a better degree around the intertwined portions, and the mat tends to have higher shear strength. Further, the mat is caused to be in a state as if it were securely sewn owing to the first long fibrous substance, the short fibrous substance, and the second long fibrous substance around the intertwined portions, and thus the mat tends to securely have a low volume.

Furthermore, the first long fibrous substance and the second long fibrous substance each have a sufficiently long average fiber length. Thus, the mat tends to securely have good flexibility.

In addition, the mat has the second layer including the short fibrous substance which has an average fiber length of not shorter than about 3.5 mm and not longer than about 20 mm and is less likely to form a high-density portion. Thus, the density of the inorganic fibrous substances is made equal and tends to be less varied in the whole mat even though the mat has the first layer and the third layer including the inorganic fibrous substances with the densities greatly varied.

Therefore, the mat is more likely to be uniformly bent, and a holding sealing material including this mat is excellent in handleability upon wrapping and is less likely to suffer creases upon stuffing.

Further, in general, the short fibrous substance having the above average fiber length is produced at sufficiently lower cost than the first long fibrous substance and the second long fibrous substance in many cases. Thus, the production cost of the mat tends to be securely kept low.

The average fiber length of the short fibrous substance is shorter than the average fiber length of the first long fibrous substance and the average fiber length of the second long fibrous substance. Thus, the mat of the present invention excludes a mat in which the average fiber length of the first long fibrous substance, the average fiber length of the short fibrous substance, and the average fiber length of the second long fibrous substance are 20 mm.

In the mat according to the embodiment of the present invention, a ratio between the sum of thicknesses of the first layer and the third layer and a thickness of the second layer is preferably from about 1:1 to about 1:5. In other words, the following relationship is preferably satisfied:

Sum of thicknesses of first layer and third layer:thickness of second layer=from about 1:1 to about 1:5.

A ratio between the sum of the thicknesses of the first layer and the third layer and the thickness of the second layer of from about 1:1 to about 1:5 does not cause insufficient amounts of the first long fibrous substance and the second long fibrous substance. Thus, the mat tends to securely have high shear strength, an appropriately low volume, and good flexibility.

Further, the amount of the short fibrous substance is not too small, and the density of the inorganic fibrous substances tends to be less varied in the whole mat.

Furthermore, the amount of the first long fibrous substance in the whole mat is limited to a requisite minimum. Thus, the production cost tends to be securely lowered.

If the sum of the thicknesses of the first layer and the third layer is lower than the maximum value of the sum of the thicknesses of the first layer and the third layer in the above ratio (the sum of thicknesses of first layer and third layer: thickness of second layer=about 1:1), the amount of the short fibrous substance in the mat is not so small that the density of the inorganic fibrous substances is less likely to be much varied in the whole mat, less likely resulting in deteriorated handleability upon wrapping and occurrence of creases upon stuffing. Further, the production cost of the mat is less likely to be high.

If the sum of the thicknesses of the first layer and the third layer is greater than the minimum value of the sum of the thicknesses of the first layer and the third layer in the above ratio (the sum of thicknesses of first layer and third layer: thickness of second layer=about 1:5), the amounts of the first long fibrous substance and the second long fibrous substance in the mat are not so small that the shear strength of the mat is less likely to be low. Further, the volume of the mat is likely to be low and the flexibility thereof is less likely to be low.

In the mat according to the embodiment of the present invention, the inorganic fibrous substances are preferably at least one inorganic fibrous material selected from the group consisting of fibrous alumina, fibrous alumina-silica, fibrous silica, fibrous soluble matter, and fibrous glass.

These inorganic fibrous substances are excellent in characteristics such as heat resistance. Thus, a mat including such inorganic fibrous substances and a holding sealing material including the mat tends to be excellent in characteristics such as heat resistance and holding force.

In the case that the inorganic fibrous substances constituting the mat include fibrous soluble matter, the mat tends to be excellent in safety to the human body because, even if the fibrous soluble matter is scattered and taken into the human body upon handling the mat, the fibrous soluble matter is dissolved and then discharged outside the body.

The method for producing a mat according to one embodiment of the present invention includes:

preparing a sheet having a first main face and a second main face opposite to the first main face, the sheet including inorganic fibrous substance precursors being intertwined with each other and being designed to be inorganic fibrous substances after the following firing, and the sheet including at least two sub-sheets, the at least two sub-sheets including:

a first sub-sheet occupying a certain area from the first main face along the thickness direction of the mat, the first sub-sheet including a first long fibrous substance precursor which includes one of the inorganic fibrous substance precursors; and a second sub-sheet being adjacent to the first sub-sheet, the second sub-sheet including a short fibrous substance precursor which includes one of the inorganic fibrous substance precursors and which has an average fiber length shorter than an average fiber length of the first long fibrous substance precursor;

needling the sheet bypassing needles through the sheet from the first main face to the second main face to prepare a needled sheet; and firing the needled sheet.

The method for producing a mat according to the embodiment of the present invention tends to suitably provide the aforementioned mat according to the embodiment of the present invention.

The following will describe one example of the needling performed in the method for producing a mat according to the embodiment of the present invention referring to the drawings.

Figure 2A:
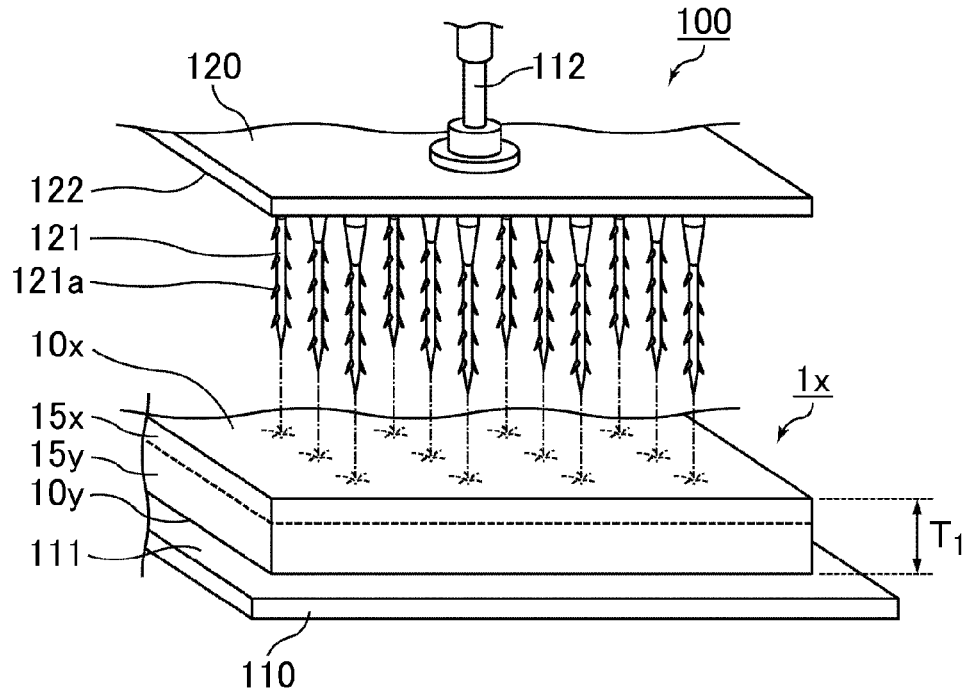
FIG. 2A is a perspective view schematically showing a needling apparatus and a sheet used in the needling in the method for producing a mat according to an embodiment of the present invention.
Figure 2B:
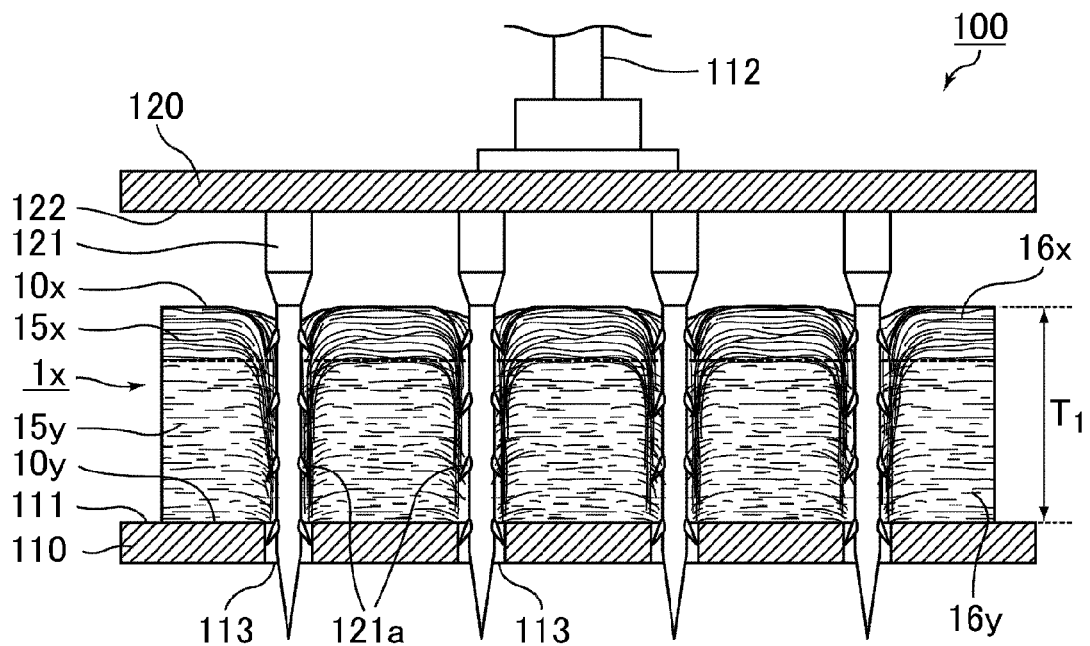
FIG. 2B is a cross-sectional view schematically showing the needling apparatus and the sheet when the needles are passed through the sheet in the method for producing a mat according to the embodiment of the present invention.

FIG. 2A is a perspective view schematically showing a needling apparatus and a sheet used in the needling in the method for producing a mat according to the embodiment of the present invention. FIG. 2B is a cross-sectional view schematically showing the needling apparatus and the sheet when the needles are being passed through the sheet in the method for producing a mat according to the embodiment of the present invention.

The needling apparatus 100 shown in FIG. 2A includes a supporting plate 110 which has a mounting face 111 capable of holding a sheet 1x; a piston 112 which is capable of moving up and down along the piercing direction (the thickness direction of the sheet 1x, the direction indicated by a double-headed arrow $T_1$ in FIG. 2A and FIG. 2B); and a needle plate 120 which is opposite to the mounting face 111 of the supporting plate 110 and which is disposed on the tip of the piston 112.

The needle plate 120 is equipped with multiple needles 121 at predetermined intervals. The needles are disposed on an opposite face 122 opposite to the supporting plate 110 and extend along the vertical direction, so that the needles are arranged in a pinholder-like shape. The needles 121 each are finely tapered toward the tip, and are equipped with multiple thorn-like barbs 121a. The barbs 121a are disposed on the surface of the needles and extend in the direction of the needle tips.

Further, the supporting plate 110 has openings 113 at positions corresponding to the needles 121 of the needle plate 120.

As a result, the needles 121 pass through the corresponding openings 113 when the needle plate 120 is brought close to the supporting plate 110. Thus, the needle plate 120 can be brought close to the supporting plate 110 to the extent that the mounting face 111 is in contact with the opposite face 122.

The following will describe the structure of the sheet 1x.

The sheet 1x includes a first sub-sheet 15x and a second sub-sheet 15y. The first sub-sheet 15x has a first main face 10x and occupies a certain area from the first main face 10x along the thickness direction of the sheet 1x. The second sub-sheet 15y is adjacent to the first sub-sheet 15x, has a second main face 10y, and occupies a certain area from the second main face 10y along the thickness direction of the sheet 1x.

The sheet used in the method for producing a mat according to the embodiment of the present invention may be any sheet including at least two sub-sheets. It is not particularly limited to the sheet including two sub-sheets (the first sub-sheet 15x and the second sub-sheet 15y) as exemplified in FIG. 2A and FIG. 2B.

For example, the first sub-sheet or the second sub-sheet may be divided into multiple sheets; one or more sub-sheets including an inorganic fibrous substance precursor having various compositions, average fiber lengths, and average fiber diameters may be disposed between the first sub-sheet and the second sub-sheet; or these sub-sheets are further adjacent to the second sub-sheet, so that the sheet may have three or more multi-layer structure.

The sheet 1x includes inorganic fibrous substance precursors intertwined with each other.

Specifically, the first sub-sheet 15x includes a first long fibrous substance precursor 16x, and the second sub-sheet 15y includes a short fibrous substance precursor 16y having an average fiber length shorter than that of the first long fibrous substance precursor 16x. Here, the inorganic fibrous substance precursors are fired to be converted into the inorganic fibrous substances constituting the aforementioned mat according to the embodiment of the present invention.

As shown in FIG. 2A, the sheet 1x is placed on the mounting face 111 of the supporting plate 110 for the needling.

The sheet 1x is placed such that the first main face 10x of the sheet 1x is opposite to the opposite face 122 of the needle plate 120 and the second main face 10y of the sheet 1x is in contact with the mounting face 111 of the supporting plate 110.

Then, the needle plate 120 is moved up and down along the thickness direction of the sheet 1x.

As a result, the needles 121 are passed through the first sub-sheet 15x and the second sub-sheet 15y in this order from the first main face 10x of the sheet 1x to the second main face 10y thereof. Finally, the piercing needles 121 are extracted from the sheet 1x, and thereby the needling is completed.

As shown in FIG. 2B, the needles 121 moves inside the sheet 1x in a state that a first long fibrous substance precursor 16x winds around the barbs 121a when the needles 121 are piercing the sheet 1x from the first main face 10x in the needling. Thus, the first long fibrous substance precursor 16x winding around the barbs 121a are brought into the sheet 1x.

Since the first long fibrous substance precursor 16x has a sufficiently long average fiber length, it is not promptly cut while being brought into the sheet and is likely to be intertwined with the short fibrous substance precursor 16y constituting the second sub-sheet 15y at the positions where the needles 121 pierce the sheet. The first long fibrous substance precursor 16x and the short fibrous substance precursor 16y closely intertwined with each other are arranged in the direction in which the needles 121 pierce the sheet (in other words, toward the second main face 10y).

When the needles 121 are extracted from the sheet 1x, in contrast, the first long fibrous substance precursor 16x and the short fibrous substance precursor 16y are little less likely to wind around the barbs 121a. Thus, most parts of the first long fibrous substance precursor 16x and the short fibrous substance precursor 16y are maintained in the aforementioned arranged state and intertwined state.

As a result, precursors for intertwined portions are continuously formed in the thickness direction from the respective first intertwined points on the first main face 10x to the corresponding second intertwined points on the second main face 10y after the needles 121 are thoroughly extracted from the sheet 1x.

The first intertwined points are formed on the first main face 10x at the positions where the needles 121 pierce, and the second intertwined points are formed on the second main face 10y at the positions where the needles 121 pierce.

In the method for producing a mat according to the embodiment of the present invention, the average fiber length of the first long fibrous substance precursor is preferably about two or more times as long as the thickness of the sheet.

This is because such a preferable mode tends to enable suitable production of the mat according to the embodiment of the present invention wherein the first long fibrous substance has an average fiber length about two or more times as long as the thickness of the mat.

In the method for producing a mat according to the embodiment of the present invention, the average fiber length of the first long fibrous substance precursor is preferably not shorter than about 30 mm and not longer than about 140 mm, and the average fiber length of the short fibrous substance precursor is preferably not shorter than about 5 mm and not longer than about 30 mm.

This is because such a preferable mode tends to enable suitable production of the mat according to the embodiment of the present invention wherein the average fiber length of the first long fibrous substance is not shorter than about 20 mm and not longer than about 100 mm and the average fiber length of the short fibrous substance is not shorter than about 3.5 mm and not longer than about 20 mm.

In the method for producing a mat according to the embodiment of the present invention, a ratio between a thickness of the first sub-sheet and a thickness of the second sub-sheet is preferably from about 1:1 to about 1:10. In other words, the following relationship is preferably satisfied:

Thickness of first sub-sheet:thickness of second sub-sheet=from about 1:1 to about 1:10.

This is because such a preferable mode tends to enable suitable production of the mat according to the embodiment of the present invention wherein the ratio between the thickness of the first layer and the thickness of the second layer is from about 1:1 to about 1:10.

In the method for producing a mat according to the embodiment of the present invention, the sheet may further include a third sub-sheet occupying a certain area from the second main face along the thickness direction of the sheet. The third sub-sheet may include a second long fibrous substance precursor having an average fiber length longer than the average fiber length of the short fibrous substance precursor.

The method for producing a mat according to the embodiment of the present invention tends to suitably provide the mat according to the embodiment of the present invention including the third layer.

Here, the sheet used in the method for producing a mat according to the embodiment of the present invention may be any sheet including at least three sub-sheets, and is not limited to the sheet including three sub-sheets.

For example, the first sub-sheet, the second sub-sheet, or the third sub-sheet may be divided into multiple sheets; or one or more sub-sheets including inorganic fibrous substance precursors having various compositions, average fiber lengths, and average fiber diameters may be disposed between the first sub-sheet and the second sub-sheet or between the second sub-sheet and the third sub-sheet, so that the sheet may have a three or more multi-layer structure.

In the needling of the method for producing a mat according to the embodiment of the present invention, the needles are preferably passed through the sheet from the first main face to the second main face and the needles are passed through the sheet from the second main face to the first main face.

This is because such a preferable mode tends to enable suitable production of the mat according to the embodiment of the present invention having the first intertwined portions including the first long fibrous substance, the short fibrous substance, and the second long fibrous substance which are arranged in the direction toward the side of the second main face and which are closely intertwined with each other, and the second intertwined portions including the first long fibrous substance, the short fibrous substance, and the second long fibrous substance which are arranged in the direction toward the side of the first main face and which are closely intertwined with each other.

In the method for producing a mat according to the embodiment of the present invention, the average fiber lengths of the first long fibrous substance precursor and the second long fibrous substance precursor each are preferably about two or more times as long as the thickness of the sheet.

This is because such a preferable mode tends to enable suitable production of the mat according to the embodiment of the present invention wherein the first long fibrous substance and the second long fibrous substance each have an average fiber length about two or more times as long as the thickness of the mat.

In the method for producing a mat according to the embodiment of the present invention, the average fiber length of the first long fibrous substance precursor is preferably not shorter than about 30 mm and not longer than about 140 mm, the average fiber length of the short fibrous substance precursor is preferably not shorter than about 5 mm and not longer than about 30 mm, and the average fiber length of the second long fibrous substance precursor is preferably not shorter than about 30 mm and not longer than about 140 mm.

This is because such a preferable mode tends to enable suitable production of the mat according to the embodiment of the present invention wherein the first long fibrous substance has an average fiber length of not shorter than about 20 mm and not longer than about 100 mm, the short fibrous substance has an average fiber length of not shorter than about 3.5 mm and not longer than about 20 mm, and the second long fibrous substance has an average fiber length of not shorter than about 20 mm and not longer than about 100 mm.

In the method for producing a mat according to the embodiment of the present invention, the ratio between the sum of the thicknesses of the first sub-sheet and the third sub-sheet and the thickness of the second sub-sheet is preferably from about 1:1 to about 1:5. In other words, the following relationship is preferably satisfied:

Sum of thicknesses of first sub-sheet and third sub-sheet:thickness of second sub-sheet=from about 1:1 to about 1:5.

This is because such a preferable mode tends to enable suitable production of the mat according to the embodiment of the present invention wherein the ratio between the sum of the thicknesses of the first layer and the third layer and the thickness of the second layer is from about 1:1 to about 1:5.

In the method for producing a mat according to the embodiment of the present invention, the inorganic fibrous substance precursors preferably are at least one inorganic fibrous material precursor selected from the group consisting of fibrous alumina precursors, fibrous alumina-silica precursors, fibrous silica precursors, fibrous soluble matter precursors, and fibrous glass precursors.

This is because such a preferable mode tends to enable suitable production of the mat according to the embodiment of the present invention including inorganic fibrous substances which are at least one inorganic fibrous material selected from the group consisting of fibrous alumina, fibrous alumina-silica, fibrous silica, fibrous soluble matter, and fibrous glass.

The exhaust gas purifying apparatus according to one embodiment of the present invention includes: an exhaust gas treating body; a casing which accommodates the exhaust gas treating body; and a holding sealing material which is disposed between the exhaust gas treating body and the casing and which holds the exhaust gas treating body, wherein the holding sealing material includes any one of the mats according to the embodiment of the present invention.

The exhaust gas purifying apparatus according to one embodiment of the present invention includes: an exhaust gas treating body; a casing which accommodates the exhaust gas treating body; and a holding sealing material which is disposed between the exhaust gas treating body and the casing and which holds the exhaust gas treating body, wherein the holding sealing material includes any one of the mats produced by the method for producing a mat according to the embodiment of the present invention.

(First Embodiment)

The following will describe the first embodiment, which is one embodiment of the mat, the method for producing a mat, and the exhaust gas purifying apparatus of the present invention, referring to the drawings.

Since the mat of the present embodiment has the same structure as the aforementioned mat according to the embodiment of the present invention, the following description will refer to FIG. 1A and FIG. 1B. Further, the same matters as those mentioned in the description of the mat according to the embodiment of the present invention will be omitted here.

The mat 1 of the present embodiment shown in FIG. 1A and FIG. 1B has a substantially rectangular shape in a plan view with a predetermined length (indicated by a double-headed arrow L in FIG. 1A), width (indicated by a double-headed arrow W in FIG. 1A) and thickness (indicated by a double-headed arrow T in FIG. 1A).

The specific size of the mat 1 is not particularly limited, and is from about 100 mm to about 10,000 mm in length×from about 100 mm to about 1,500 mm in width×from about 5 mm to about 30 mm in thickness.

The mat 1 has a first main face 10a, which is the largest face among the faces of the mat 1, and a second main face 10b opposite to the first main face 10a. The mat includes two layers: a first layer 14a having the first main face 10a and a second layer 14b adjacent to the first layer 14a.

The ratio between the thickness of the first layer 14a and the thickness of the second layer 14b is preferably from about 1:1 to about 1:10.

The mat 1 includes inorganic fibrous substances intertwined with each other. The first layer 14a includes a first long fibrous substance 15a, and the second layer 14b includes a short fibrous substance 15b having an average fiber length shorter than that of the first long fibrous substance 15a.

The inorganic fibrous substances (the first long fibrous substance 15a and the short fibrous substance 15b) are preferably at least one inorganic fibrous material selected from the group consisting of fibrous alumina, fibrous alumina-silica, fibrous silica, fibrous soluble matter, and fibrous glass.

Fibrous alumina may contain additives such as CaO, MgO, and $ZrO_2$ in addition to alumina.

The weight ratio in fibrous alumina-silica is preferably $Al_2O_3:SiO_2$=from about 60:40 to about 80:20, and more preferably $Al_2O_3:SiO_2$=from about 70:30 to about 74:26.

Fibrous silica may contain additives such as CaO, MgO, and $ZrO_2$ in addition to silica.

Fibrous soluble matter is an inorganic fibrous substance which is at least one compound selected from the group consisting of alkaline metal compounds, alkaline earth metal compounds, and boron compounds.

The fibrous soluble matter which is these compounds is what is called a biosoluble inorganic fibrous substance, and is easily dissolved even if it is taken into the human body. Thus, the mat including such inorganic fibrous substances intertwined with each other is excellent in safety to the human body. Examples of the alkaline metal compounds include oxides of Na and K. Examples of the alkaline earth metal compounds include oxides of Mg, Ca, and Ba. Examples of the boron compounds include oxides of B.

The compositions of the first long fibrous substance 15a and the short fibrous substance 15b may be the same as or different from each other.

The first long fibrous substance 15a preferably has an average fiber length about two or more times as long as the thickness of the mat 1.

Specifically, the average fiber length of the first long fibrous substance 15a is preferably not shorter than about 20 mm and not longer than about 100 mm, and the average fiber length of the short fibrous substance 15b is preferably not shorter than about 3.5 mm and not longer than about 20 mm.

The first long fibrous substance 15a and the short fibrous substance 15b each preferably have an average fiber diameter of from about 3 μm to about 10 μm. If the average fiber diameters of the first long fibrous substance 15a and the short fibrous substance 15b each are from about 3 μm to about 10 μm, the first long fibrous substance 15a and the short fibrous substance 15b each tend to have sufficiently high strength and flexibility. Thus, the mat 1 tends to have improved shear strength and flexibility.

First intertwined points 11a are formed on the first main face 10a, and second intertwined points 11b are formed on the second main face 10b. Further, intertwined portions 12 each are continuously formed from the respective first intertwined points 11a to the corresponding second intertwined points 11b along the thickness direction of the mat 1.

Here, the first intertwined points 11a, the second intertwined points 11b, and the intertwined portions 12 are formed at the portions where the needles are passed through the sheet in the aforementioned needling.

The intertwined portions 12 include the first long fibrous substance 15a and the short fibrous substance 15b which are arranged in the direction toward the side of the second main face 10b and which are intertwined with each other.

Further, the mat 1 is in a state as if it were sewn along the thickness direction owing to the first long fibrous substance 15a and the short fibrous substance 15b closely intertwined with each other around the intertwined portions 12. Thus, the inorganic fibrous substances show a higher density in the vicinity of the intertwined portions 12 than in non-formation regions 13 where no intertwined portion 12 is formed.

The intertwined portions 12 are preferably formed at a formation density of from about 0.5 portions/cm$^2$ to about 30 portions/cm$^2$. This is because such a preferable mode tends to enable the mat 1 to have higher shear strength and an appropriately low volume.

If the formation density of the intertwined portions is not less than about 0.5 portions/cm$^2$, the number of the intertwined portions formed per unit area is not so small that the shear strength of the mat is less likely to be low and the volume thereof is likely to be low.

Further, if the formation density of the intertwined portions is not higher than about 30 portions/cm$^2$, the number of the intertwined portions formed per unit area is not so large that the volume of the mat is less likely to be too low, and thus the repulsive force is less likely to be low. Furthermore, a large amount of inorganic fibrous substances in the mat are not finely cut upon the needling, so that the shear strength of the mat is less likely to be low.

The term "formation density" of the intertwined portions herein means the number of intertwined portions formed per 1 cm$^2$ in the main cross section determined as follows: the mat is substantially divided into two equal parts at the middle point of the mat in the thickness direction along the plane substantially parallel to the first main face and the second main face, and then the obtained main cross section is observed and the number is counted visually or with a magnifying glass.

The intertwined portions 12 are formed in multiple lines along the longitudinal direction and the width direction of the mat 1. In each line of the intertwined portions 12 along the longitudinal direction of the mat 1, the intertwined portions 12 are formed at substantially uniform intervals. In each line of the intertwined portions 12 along the width direction of the mat 1, the intertwined portions 12 are formed at substantially uniform intervals.

The minimum distance between one first intertwined point 11a (one second intertwined point 11b) and another first intertwined point 11a (another second intertwined point 11b) which is nearest to the one first intertwined point 11a (the one second intertwined point 11b) (hereinafter, also referred to as the nearest first intertwined point 11a (the nearest second intertwined point 11b)) (the distance indicated by a double-headed arrow X in FIG. 1A) is preferably from about 1 mm to about 10 mm. This is because the intertwined portions 12 are not densely formed, so that the shear strength of the mat 1 is likely to be sufficiently high, and the volume of the mat 1 is likely to be appropriately low.

If the minimum distance between one first intertwined point (second intertwined point) and the nearest first intertwined point (second intertwined point) is not greater than about 10 mm, the number of the intertwined portions per unit area is not so small that the shear strength is less likely to be low and the volume is likely to be low.

Further, if the minimum distance is not less than about 1 mm, the number of the intertwined portions per unit area is not so large that the volume of the mat is less likely to be too low, and thereby the repulsive force is less likely to be low. Furthermore, a large amount of the inorganic fibrous substances in the mat are not finely cut upon the needling, so that the shear strength of the mat is less likely to be low.

The first intertwined points 11a and the second intertwined points 11b each preferably have a diameter of from about 0.1 mm to about 2 mm.

Diameters of the first intertwined points 11a and the second intertwined points 11b in the aforementioned ratio are not so great, and thus the shear strength of the mat 1 is likely to be sufficiently high.

Diameters of the first intertwined points and the second intertwined points not greater than about 2 mm tend not to cause the inorganic fibrous substances constituting the first intertwined points, the second intertwined points, and the intertwined portions to be in a coarse state. Thus, the shear strength of the mat is less likely to be low.

Diameters of the first intertwined points and the second intertwined points not smaller than about 0.1 mm tend to cause the first long fibrous substance and the short fibrous substance to be sufficiently intertwined with each other in the intertwined portions. Thus, the shear strength of the mat is less likely to be low, and the volume of the mat is likely to be sufficiently low.

The weight of the mat 1 (the weight per unit area) is preferably from about 900 g/m$^2$ to about 3000 g/m$^2$.

The weight of the mat 1 is more preferably from about 1,500 g/m$^2$ to about 2,800 g/m$^2$.

Further, the density of the mat 1 is preferably from about 0.08 g/m$^3$ to about 0.20 g/cm$^3$.

The density of the mat 1 is more preferably from about 0.10 g/m$^3$ to about 0.15 g/cm$^3$.

The following will describe the structures of a holding sealing material and an exhaust gas purifying apparatus including the mat of the present embodiment, referring to the drawings.

Figure 3:
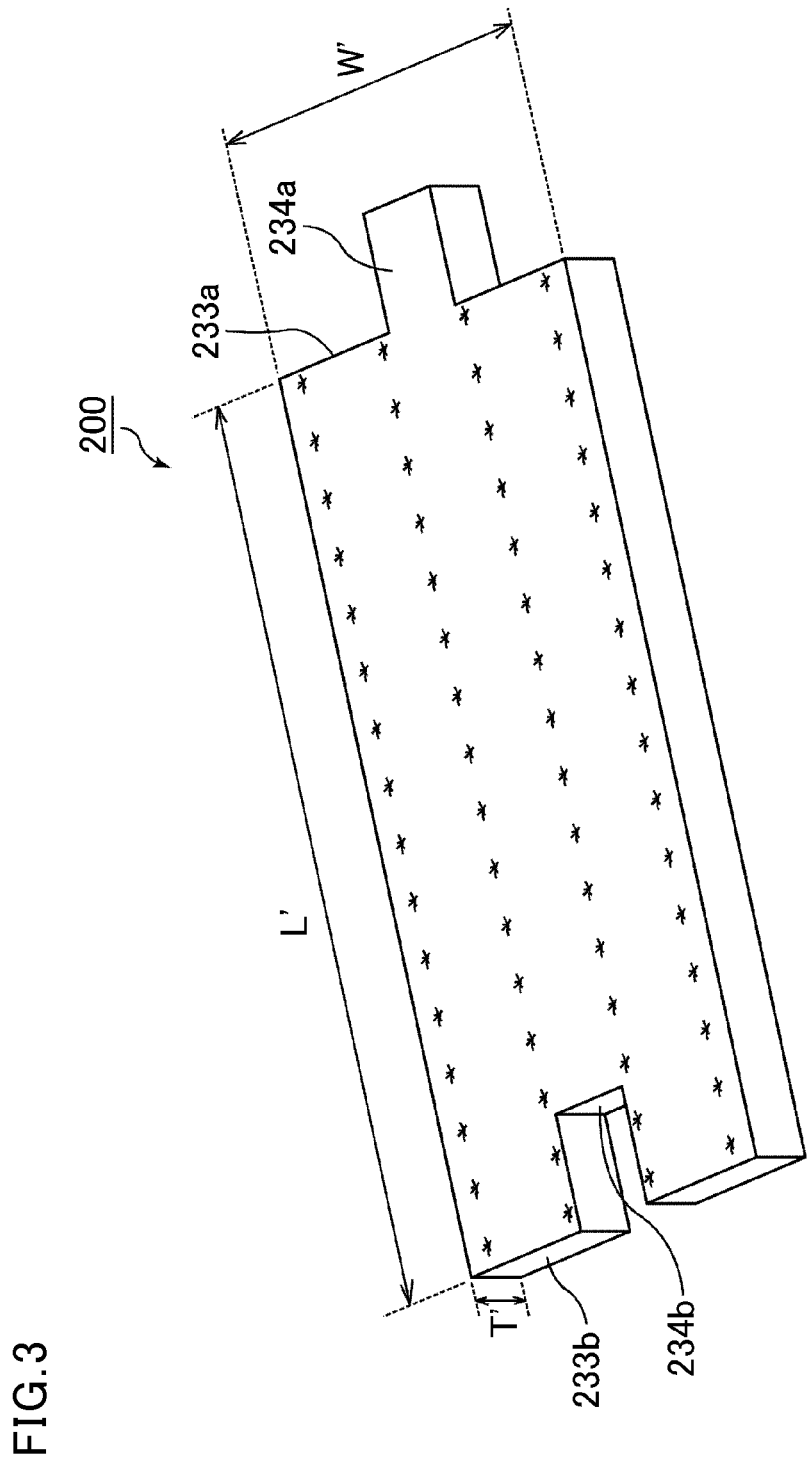
FIG. 3 is a perspective view schematically showing one example of a holding sealing material including the mat according to the first embodiment of the present invention.

FIG. 3 is a perspective view schematically showing one example of a holding sealing material including the mat according to the first embodiment of the present invention.

A holding sealing material 200 shown in FIG. 3 is produced by cutting the mat 1 of the present embodiment into a predetermined shape.

The holding sealing material 200 shown in FIG. 3 has a substantially rectangular shape in a plan view with a predetermined length (indicated by an arrow L' in FIG. 3), width (indicated by an arrow W' in FIG. 3), and thickness (indicated by an arrow T' in FIG. 3).

Further, the holding sealing material 200 has end faces 233a and 233b parallel to each other in the width direction. One end face 233a has a protruding portion 234a, and the other end face 233b has a recessed portion 234b which fits to the protruding portion 234a when the holding sealing material 200 is rolled so that the end face 233a is brought in contact with the end face 233b.

The holding sealing material 200 contains an organic binder. The total amount of the organic binder is 0.5 to 20% by weight in the weight of the whole holding sealing material 200.

The holding sealing material 200 has a size of from about 200 mm to about 1,000 mm in length×from about 50 mm to about 500 mm in width×from about 5 mm to about 30 mm in thickness.

This holding sealing material 200 may be suitably used for an exhaust gas purifying apparatus.

The following will describe the structure of the exhaust gas purifying apparatus including the holding sealing material 200 referring to the drawings.

Figure 4A:
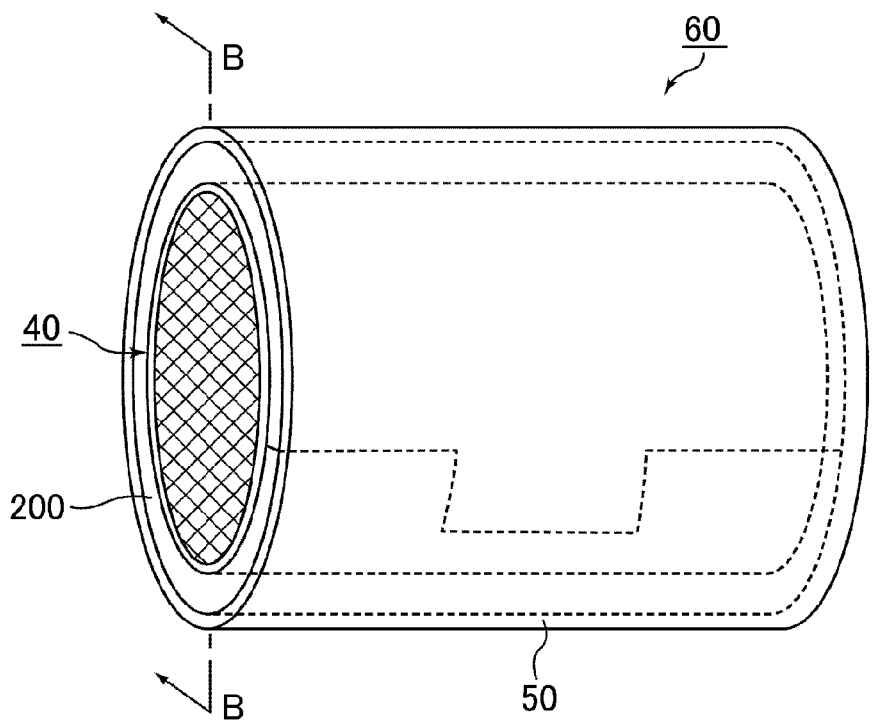
FIG. 4A is a perspective view schematically showing an exhaust gas purifying apparatus according to the first embodiment of the present invention.
Figure 4B:
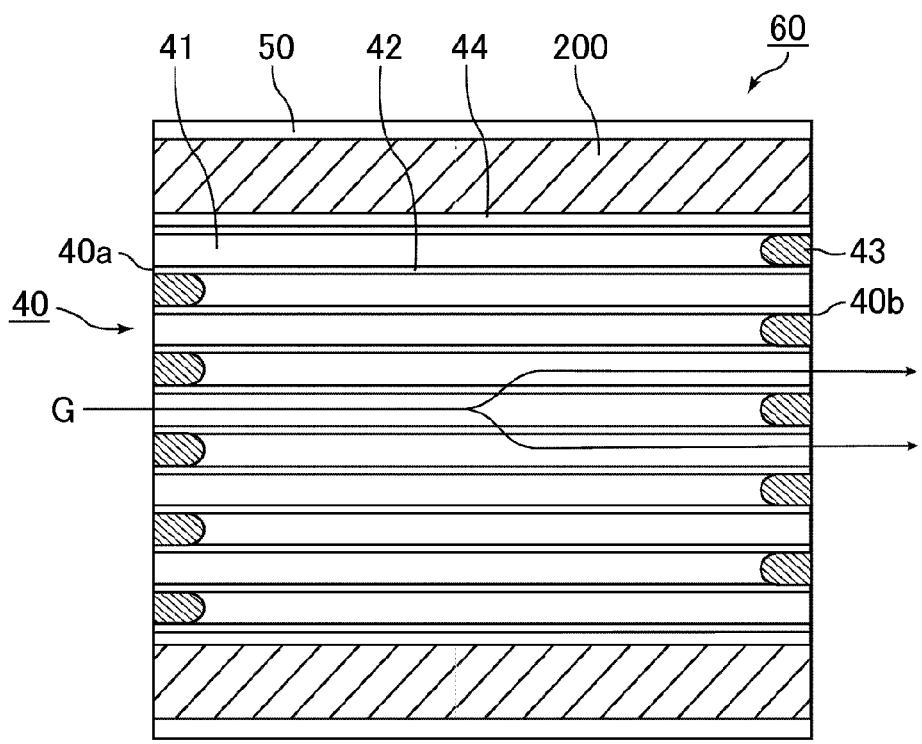
FIG. 4B is a B-B line cross-sectional view of the exhaust gas purifying apparatus shown in FIG. 4A.

FIG. 4A is a perspective view schematically showing an exhaust gas purifying apparatus according to the first embodiment of the present invention; and FIG. 4B is a B-B line cross-sectional view of the exhaust gas purifying apparatus shown in FIG. 4A.

Figure 5A:
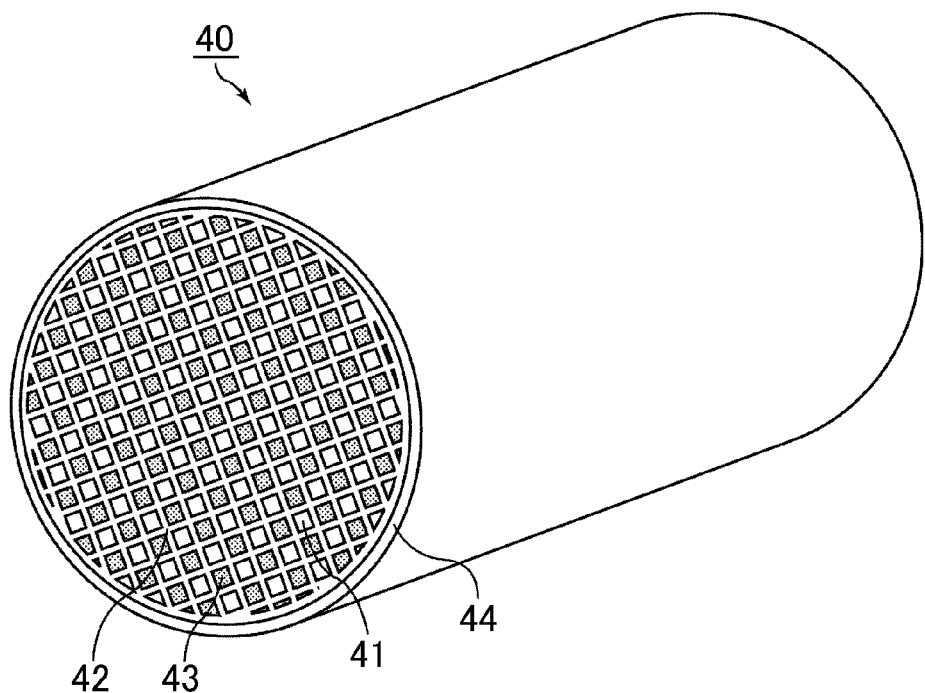
FIG. 5A is a perspective view schematically showing an exhaust gas treating body which constitutes the exhaust gas purifying apparatus shown in FIG. 4A.
Figure 5B:
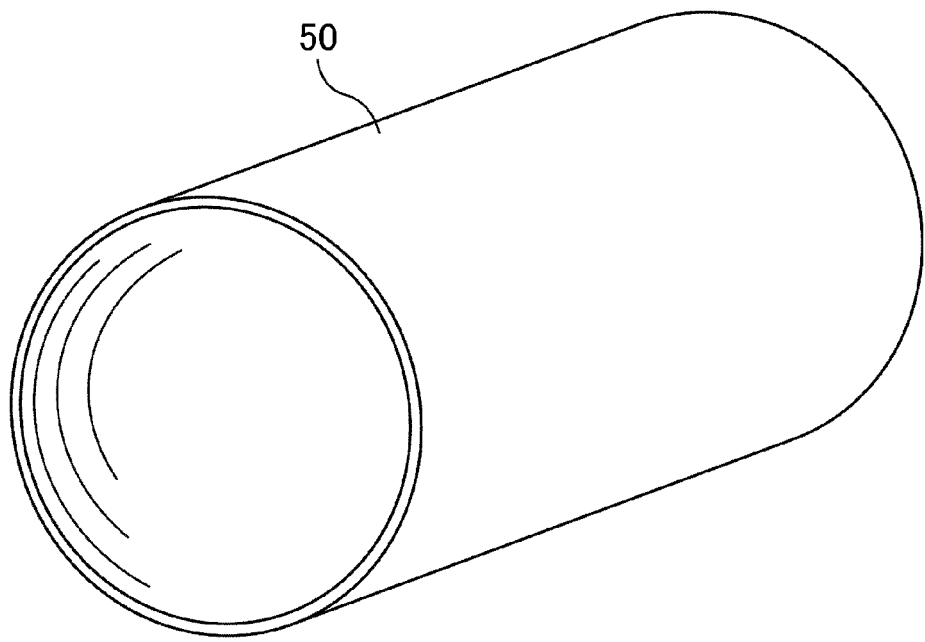
FIG. 5B is a perspective view schematically showing a casing which constitutes the exhaust gas purifying apparatus shown in FIG. 4A.

FIG. 5A is a perspective view schematically showing an exhaust gas treating body constituting the exhaust gas purifying apparatus shown in FIG. 4A; and FIG. 5B is a perspective view schematically showing the casing constituting the exhaust gas purifying apparatus shown in FIG. 4A.

As shown in FIG. 4A and FIG. 4B, an exhaust gas purifying apparatus 60 includes: a pillar-shaped exhaust gas treating body 40 having cell walls 42 which are disposed in the longitudinal direction and which define a large number of cells 41; a casing 50 which accommodates the exhaust gas treating body 40; and a holding sealing material 200 which includes the mat of the present embodiment, which is disposed between the exhaust gas treating body 40 and the casing 50, and which holds the exhaust gas treating body 40.

The structure of the holding sealing material 200 has been already mentioned, and thus is omitted here.

Further, an introduction pipe for introducing exhaust gas discharged from an internal combustion engine into the exhaust gas purifying apparatus and a discharging pipe for discharging the exhaust gas passing through the exhaust gas purifying apparatus are optionally connected to the ends of the casing 50.

As shown in FIG. 5A, the exhaust gas treating body 40 mainly includes porous ceramic, and has a substantially cylindrical shape. Further, a coating layer 44 is disposed on the periphery of the exhaust gas treating body 40 for the purpose of reinforcing the peripheral portion of the exhaust gas treating body 40, adjusting the shape, and increasing the heat resistance of the exhaust gas treating body 40.

Furthermore, either one end of each of the cells in the exhaust gas treating body 40 is sealed with a plug 43.

The exhaust gas treating body 40 may include a material such as cordierite or aluminum titanate and, as shown in FIG. 5A, it may be formed in an integrated manner. Alternately, the exhaust gas treating body may include a material such as silicon carbide or silicon-containing silicon carbide and may be formed by binding multiple pillar-shaped honeycomb fired bodies each having cell walls which are disposed in the longitudinal direction and which define a large number of cells via adhesive layers mainly including ceramic.

The following will describe the casing 50. The casing 50 shown in FIG. 5B mainly includes a metal such as stainless steel, and has a substantially cylindrical shape. The inner diameter thereof is slightly shorter than the diameter of a wrapped member prepared by wrapping the holding sealing material 200 around the exhaust gas treating body 40. The length thereof is substantially the same as that of the exhaust gas treating body 40 in the longitudinal direction.

The material of the casing is not limited to stainless steel as long as it is a heat-resistant metal. Examples thereof include metals such as aluminum and iron.

The casing may be a casing prepared by dividing a substantially cylindrical casing into multiple casing pieces along the longitudinal direction (that is, a clamshell), a C-profile or U-profile cylindrical casing having a single slit (opening) extending along the longitudinal direction, or a metal plate which is to be tightly wound around a holding sealing material wrapped around an exhaust gas treating body to form a cylindrical casing.

The following will describe the reason why the exhaust gas purifying apparatus 60 having the above structure purifies exhaust gas, referring to FIG. 4B.

As shown in FIG. 4B, exhaust gas discharged from an internal combustion engine and introduced into the exhaust gas purifying apparatus 60 (exhaust gas is indicated by G and the flow of the exhaust gas is indicated by an arrow in FIG. 4B) flows into a first cell 41, which has an opening on the end face 40a on the exhaust gas inlet side of the exhaust gas treating body 40, and passes through a cell wall 42 which defines the first cell 41. At this time, particulate matter (hereinafter, also referred to simply as PM) in the exhaust gas is captured by the cell wall 42, and thereby the exhaust gas is purified. The purified exhaust gas is discharged from a second cell 41, which has an opening on the end face 40b on the exhaust gas outlet side, and finally discharged outside the apparatus.

The following will then describe a method for producing the mat of the present embodiment, a method for producing a holding sealing material including the produced mat, and a method for producing an exhaust gas purifying apparatus including the produced holding sealing material.

The mat of the present embodiment is produced through the following steps (1) to (5).

The following will describe the case of producing a mat including fibrous alumina-silica; however, the inorganic fibrous substances constituting the mat of the present embodiment is not limited to fibrous alumina-silica, and may be the aforementioned inorganic fibrous substances including various inorganic fibrous materials such as fibrous alumina.

(1) First Sub-sheet Producing Step (1-1) First Long Fibrous Substance Preparing Sub-step A basic aluminum chloride aqueous solution is prepared so that the Al content and the atomic ratio between Al and Cl are predetermined values. Silica sol is added into the aqueous solution so that the ratio in the inorganic fibrous substance after the firing is $Al_2O_3:SiO_2=$from about 60:40 to about 80:20 (weight ratio), for example. Further, an appropriate amount of an organic polymer for increasing moldability is added thereto to prepare a liquid mixture.

The obtained liquid mixture is concentrated to be a spinning mixture. This spinning mixture is spun by a blowing method, thereby providing a first long fibrous substance precursor, which is an inorganic fibrous substance precursor having a predetermined average fiber diameter and average fiber length. In order to prepare a first long fibrous substance precursor which has an average fiber length about two or more times as long as the thickness of the sheet to be formed after the following steps, or a first long fibrous substance precursor which has an average fiber length of not shorter than about 30 mm and not longer than about 140 mm, the spinning conditions may be adjusted, for example.

The blowing method is a method of spinning an inorganic fibrous substance precursor by supplying the spinning mixture extruded from a nozzle for supplying the spinning mixture into the rapid gas stream (air stream) blowing from an air nozzle.

(1-2) Compressing Sub-step

Then, the first long fibrous substance precursor is compressed to provide a continuous long sheet with a predetermined size.

The compression may be achieved by a cross-layer method, for example.

(1-3) Cutting Sub-step

Then, the long sheet was cut into a predetermined size. Thereby, a first sub-sheet is produced.

The produced first sub-sheet has a substantially rectangular shape in a plan view and has a first main face and a second main face opposite to the first main face. The sheet includes the intertwined first long fibrous substance precursor having the predetermined average fiber length.

(2) Second Sub-sheet Producing Step

A second sub-sheet is produced through the same steps as the sub-steps (1-1) to (1-3) in the step of producing first sub-sheet (1).

Here, instead of producing the first long fibrous substance precursor in the sub-step (1-1), a short fibrous substance precursor having a average fiber length shorter than that of the first long fibrous substance precursor is produced. The same steps as the sub-step (1-2) and the sub-step (1-3) are performed using the produced short fibrous substance precursor, and thereby a second sub-sheet is produced.

In order to produce a short fibrous substance precursor having an average fiber length of not shorter than about 5 mm and not longer than about 30 mm, the spinning conditions may be adjusted, for example.

The produced second sub-sheet has a substantially rectangular shape in a plan view, and has a first main face and a second main face opposite to the first main face. The sheet includes the intertwined short fibrous substance precursor having the predetermined average fiber length.

In order to adjust the ratio between the thickness of the first sub-sheet and the thickness of the second sub-sheet to from about 1:1 to about 1:10, the thickness of the second sub-sheet may be adjusted by reducing the amount of the short fibrous substance precursor used, or changing a degree of compressing the short fibrous substance precursor.

(3) Laminating Step

The first sub-sheet is laminated on the second sub-sheet such that the second main face of the first sub-sheet is in contact with the first main face of the second sub-sheet.

Thereby, a sheet including two sub-sheets: the first sub-sheet which occupies a certain area from the first main face along the thickness direction of the sheet and a second sub-sheet which is adjacent to the first sub-sheet.

The ratio between the thickness of the first sub-sheet and the thickness of the second sub-sheet in the sheet produced through the following steps is preferably from about 1:1 to about 1:10.

(4) Needling Step

In the needling step, a needling apparatus is used for needling.

The needling apparatus may be a needling apparatus having substantially the same structure as the needling apparatus shown in FIG. 2A.

In the needling, the sheet produced in the step (3) is first placed on the mounting face such that the mounting face of the supporting plate and the second main face (the lower main face) of the sheet are in contact with each other. The needle plate above the supporting plate and the sheet is moved down along the thickness direction of the sheet, and thereby the needles are passed through the sheet from the first main face (the first main face of the first sub-sheet, in other words, the upper main face of the sheet shown in FIG. 2A and FIG. 2B) to the second main face (the second main face of the second sub-sheet, in other words, the lower main face of the sheet shown in FIG. 2A and FIG. 2B). Then, the needles are extracted from the sheet. The portions where the needles pierce on the first main face are to be first intertwined points on the first main face of the mat to be produced through the following steps. The portions where the needles pierce on the second main face are to be second intertwined points on the second main face of the mat. The portions inside the sheet where the needles pierce are to be intertwined portions of the mat.

In order to produce a mat wherein the formation density of the intertwined portions is from about 0.5 portions/cm$^2$ to about 30 portions/cm$^2$, the minimum distance between one first intertwined point (one second intertwined point) and the nearest first intertwined point (the nearest second intertwined point) is from about 1 mm to about 10 mm, and the diameters of the first intertwined points and the second intertwined points each are from about 0.1 mm to about 2 mm, a needle plate may be equipped with a predetermined number of needles (needles with a predetermined diameter) per unit area of the opposite face of the needle plate at predetermined intervals.

Through such needling, a needled sheet is produced.

(5) Firing Step

Thereafter, the needled sheet is fired at a maximum temperature of from about 1000° C. to about 1600° C. Thereby, the first long fibrous substance precursor is converted into a first long fibrous substance and the short fibrous substance precursor is converted into a short fibrous substance, so that the mat of the present embodiment is produced.

In the case of producing a holding sealing material including the mat produced through the step (5), the produced mat may be subjected to the following step (6).

(6) Shaping and Cutting Step

The mat is cut into a predetermined size to provide a holding sealing material. At this time, the mat is cut such that a protruding portion is formed on part of one end face of the holding sealing material and a recessed portion which has such a shape that fits to the protruding portion on part of the other end face of the holding sealing material.

Specifically, the holding sealing material is produced using a punching apparatus provided with a punching plate which is disposed on the tip of a piston and which is capable of moving up and down and a mounting plate which is opposite to the punching plate and on which the mat is to be mounted.

A punching blade having a shape corresponding to the outer shape of a holding sealing material to be produced and an elastic member including extendable rubber or the like material are fixed on the punching plate. Further, the mounting plate has an opening at the position corresponding to the punching blade so that the punching blade does not touch the mounting plate when the punching blade is brought close to the mounting plate.

In the case of punching the mat with such a punching apparatus, the mat is placed on the mounting plate such that the first main face of the mat faces the punching plate and the second main face of the mat faces the mounting plate, and then the punching plate is moved up and down.

The elastic member is pressed to the mat so that it contracts in the thickness direction of the mat, and simultaneously the punching blade enters the mat from the first main face of the mat and the punching blade passes through the mat. Thereby, the mat is punched into a predetermined shape shown in FIG. 3 and a holding sealing material is produced.

In the case of producing an exhaust gas purifying apparatus including the holding sealing material produced through the step (6), the produced holding sealing material may be subjected to the following step (7).

The following will describe the step (7) for producing an exhaust gas purifying apparatus referring to the drawings.

Figure 6:
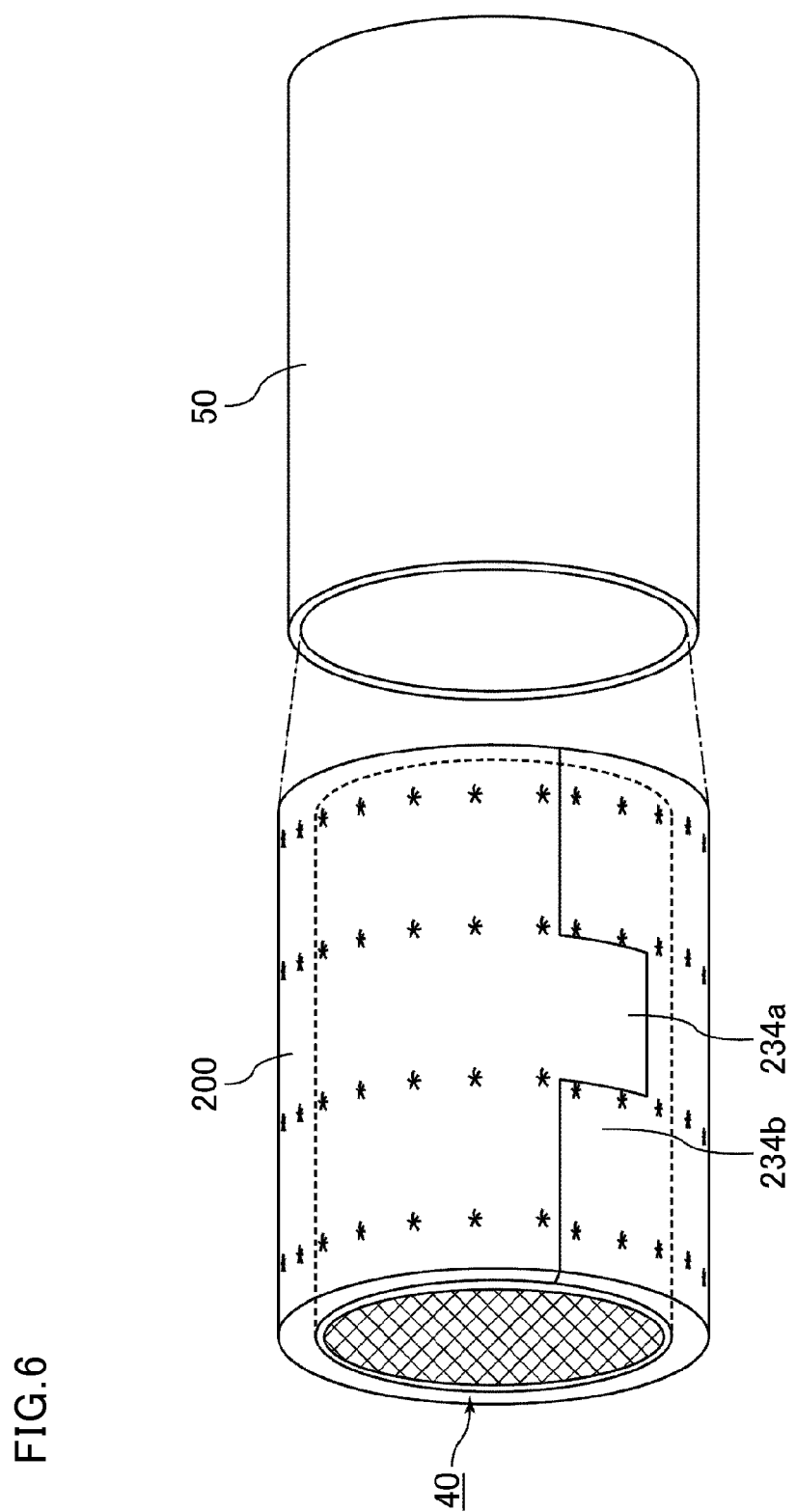
FIG. 6 is a perspective view schematically showing the state of producing the exhaust gas purifying apparatus using the holding sealing material, the exhaust gas treating body, and the casing which constitute the exhaust gas purifying apparatus according to the first embodiment of the present invention.

FIG. 6 is a perspective view schematically showing the state of producing an exhaust gas purifying apparatus using the holding sealing material, the exhaust gas treating body, and the casing which constitutes the exhaust gas purifying apparatus according to the first embodiment of the present invention.

(7) Stuffing Step

The holding sealing material 200 produced in the step (6) is wrapped around the periphery of the cylindrical exhaust gas treating body (honeycomb filter) 40 such that the protruding portion 234a and the recessed portion 234b fit to each other. Then, as shown in FIG. 6, the exhaust gas treating body 40 wrapped with the holding sealing material 200 (wrapped member) is stuffed into a cylindrical casing 50 mainly including metal. Here, the inner diameter of the casing 50 is slightly shorter than the diameter of the wrapped member.

The exhaust gas purifying apparatus 60 of the present embodiment is produced through the aforementioned steps.

The following will list the effects of the mat, the method for producing a mat, and the exhaust gas purifying apparatus according to the first embodiment of the present invention.

(1) The mat of the present embodiment has intertwined portions each continuously formed from one first intertwined point to the corresponding second intertwined point along the thickness direction of the mat.

The intertwined portions include the first long fibrous substance and the short fibrous substance which are arranged in the direction toward the side of the second main face and which are intertwined with each other. Thus, the mat tends to have high shear strength.

Further, the first long fibrous substance and the short fibrous substance intertwined with each other around the intertwined portions cause an appropriately low volume of the mat.

Therefore, in the case of producing an exhaust gas purifying apparatus using a holding sealing material which includes such a mat, the holding sealing material is less likely to be damaged and the durability thereof tends to be high. In addition, an exhaust gas treating body wrapped with the holding sealing material is likely to be easily stuffed into a casing.

Since the first layer includes the first long fibrous substance and the mat is not made from only the short fibrous substance, the mat tends to have high flexibility. Thus, the holding sealing material including such a mat is less likely to be cracked when wrapped around the exhaust gas treating body.

Since the second layer includes the short fibrous substance which has a short average fiber length and which is less likely to form a high-density portion, the density of the inorganic fibrous substances is made equal and tends to be less varied in the whole mat even though the first layer includes the first long fibrous substance which has a long average fiber length and which is likely to form a high-density portion. Therefore, the mat of the present embodiment is likely to be bent uniformly, and the holding sealing material including the mat is excellent in handleability upon wrapping and is less likely to suffer creases upon stuffing.

Further, the second layer includes a short fibrous substance which is produced at low cost and the inorganic fibrous substances constituting the mat include not only the first long fibrous substance which is produced at high cost. Thus, the production cost of the mat tends to be low.

(2) In the case that the first long fibrous substance has an average fiber length about two or more times as long as the thickness of the mat, the first long fibrous substance in the intertwined portions presumably reaches the second intertwined point from the first intertwined point. Particularly in the case that the average fiber length of the first long fibrous substance is longer than about twice the thickness of the mat, most part of the first long fibrous substance reaching the second intertwined point from the first intertwined point is presumably folded back at the second intertwined point and is more complexly intertwined with the short fibrous substance.

In the case that the average fiber length of the first long fibrous substance is not shorter than about 20 mm and not longer than about 100 mm and the average fiber length of the short fibrous substance is not shorter than about 3.5 mm and not longer than about 20 mm, the average fiber length of the first long fibrous substance and the average fiber length of the short fibrous substance are in good balance. Therefore, the first long fibrous substance and the short fibrous substance are more complexly intertwined with each other around the intertwined portions, and the shear strength tends to be higher. In addition, the first long fibrous substance and the short fibrous substance more complexly intertwined with each other around the intertwined portions cause the mat to be in a state as if it were more tightly sewn along the thickness direction, and thus the volume of the mat tends to be sufficiently low. Moreover, since the first long fibrous substance has a sufficiently long average fiber length, good flexibility tends to be ensured.

In the case that the average fiber length of the short fibrous substance is not shorter than about 3.5 mm and not longer than about 20 mm, the short fibrous substance is less likely to form a high-density portion. Thus, the density of the inorganic fibrous substances is made equal in the whole mat. Therefore, the holding sealing material including this mat is excellent in handleability upon wrapping, and is less likely to suffer creases upon stuffing.

In general, the short fibrous substance having an average fiber length of not shorter than about 3.5 mm and not longer than about 20 mm is produced at lower cost than the first long fibrous substance, in many cases. Thus, the production cost of the mat tends to be sufficiently low.

(3) In the case that the ratio between the thickness of the first layer and the thickness of the second layer is from about 1:1 to about 1:10, the amount of the first long fibrous substance is not too small, likely resulting in securely high shear strength, appropriately low volume, and good flexibility of the mat.

Further, the amount of the short fibrous substance is not too small, and the density of the inorganic fibrous substances tends to be less varied in the whole mat.

Furthermore, the amount of the first long fibrous substance used in the whole mat is kept at the necessity minimum, and thus the production cost tends to be lower.

(4) In the case that the inorganic fibrous substances constituting the mat are at least one inorganic fibrous material selected from the group consisting of fibrous alumina, fibrous alumina-silica, fibrous silica, fibrous soluble matter, and fibrous glass which are excellent in characteristics such as heat resistance, the mat and a holding sealing material including the mat tend to be excellent in characteristics such as heat resistance and holding force.

In the case that the inorganic fibrous substances constituting the mat is fibrous soluble matter, the mat tends to be excellent in safety to the human body because, even if the fibrous soluble matter is scattered upon handling the mat and taken into the human body, it is dissolved and is discharged outside the body.

(5) The method for producing a mat of the present embodiment tends to suitably provide the mat of the present embodiment having the aforementioned structure and showing the aforementioned effects.

(6) Since the exhaust gas purifying apparatus of the present embodiment includes the exhaust gas treating body having the aforementioned structure, it tends to remove PM and gaseous harmful matter in exhaust gas.

Further, since the holding sealing material constituting the exhaust gas purifying apparatus includes the mat of the present embodiment which is produced at low cost and which has high shear strength, the holding sealing material is less likely to be damaged when used and the production cost of the exhaust gas purifying apparatus tends to be low.

EXAMPLES

Example 1

The mat of the present embodiment was produced through the following steps (1) to (5).
(1) First Sub-sheet Producing Step
(1-1) Spinning Sub-step A basic aluminum chloride aqueous solution was prepared so that the Al content was 70 g/l and Al:Cl=1:1.8 (atomic ratio). Silica sol was added to the solution so that the ratio in the inorganic fibrous substance after the firing was $Al_2O_3$:$SiO_2$=72:28 (weight ratio). Further, an appropriate amount of an organic polymer (polyvinyl alcohol) was added thereto. Thereby, a liquid mixture was prepared.

The obtained liquid mixture was concentrated to be a spinning mixture. This spinning mixture was spun by the blowing method. Thereby, an inorganic fibrous substance precursor (first long fibrous substance precursor) was produced.

The first long fibrous substance precursor had an average fiber length of 100 mm and an average fiber diameter of 8.0 µm.
(1-2) Compressing Sub-step The first long fibrous substance precursor obtained in the sub-step (1-1) was compressed by the cross-layer method. Thereby, a continuous long sheet with a predetermined size was produced.
(1-3) Cutting Sub-step The long sheet was cut into a predetermined size. Thereby, a first sub-sheet was produced.

The produced first sub-sheet had a substantially rectangular shape in a plan view, a size of 150 mm in length×150 mm in width×6.3 mm in thickness, and a weight per unit area of 340 g/m².
(2) Second Sub-Sheet Producing Step The same operation as in the sub-step (1-1) was performed. Thereby, a short fibrous substance precursor was prepared.

Here, the spinning conditions were changed so that the short fibrous substance precursor had an average fiber length of 20 mm and an average fiber diameter of 8.0 µm.

The short fibrous substance precursor was compressed in the same manner as in the sub-step (1-2). Thereby, a continuous long sheet with a predetermined size was produced.

The produced long sheet was cut into a predetermined size in the same manner as in the sub-step (1-3). Thereby, a second sub-sheet was produced.

The produced second sub-sheet had a substantially rectangular shape in a plan view, a size of 150 mm in length×150 mm in width×18.7 mm in thickness, and a weight per unit area of 1,020 g/m².
(3) Laminating Step The first sub-sheet was laminated on the second sub-sheet such that the second main face of the first sub-sheet was in contact with the first main face of the second sub-sheet.

Thereby, a sheet including two sub-sheets was produced. The two sub-sheets included a first sub-sheet occupying a certain area from the first main face along the thickness direction of the sheet and a second sub-sheet adjacent to the first sub-sheet.

The produced sheet had a substantially rectangular shape in a plan view, a size of 150 mm in length×150 mm in width× 25 mm in thickness, and a weight per unit area of 1,360 g/m².

The ratio between the thickness of the first sub-sheet and the thickness of the second sub-sheet in the produced sheet was 1:3.

(4) Needling Step

A needling apparatus having a structure schematically shown in FIG. 2A was prepared.

Here, the needle plate was provided with seven needles per unit area (1 cm$^2$) on the opposite face of the needle plate at predetermined intervals (the minimum distance between the needles: 1 mm). The needles each were 2 mm in diameter.

The sheet was placed on the mounting face of the supporting plate of the needling apparatus such that the mounting face was in contact with the second main face (lower main face) of the sheet. The supporting plate and the needle plate above the sheet were moved down along the thickness direction of the sheet, and thereby the needles were passed through the sheet from the first main face (upper main face) to the second main face. Thereafter, the needles were extracted from the sheet.

As a result of the needling, a needled sheet was produced.

(5) Firing Step

The needled sheet was fired at a maximum temperature of 1200° C. Thereby, the mat of the present embodiment was produced.

The produced mat had a size of 105 mm in length×105 mm in width×10 mm in thickness and a weight per unit area of 1,400 g/m$^2$.

The first layer formed by firing the first sub-sheet had a thickness of 2.5 mm. The second layer formed by firing the second sub-sheet had a thickness of 7.5 mm. The ratio between the thickness of the first layer and the thickness of the second layer was 1:3.

The mat included intertwined fibrous alumina-silica. The first layer included a first long fibrous substance having an average fiber length of 70 mm, and the second layer included a short fibrous substance having an average fiber length of 14 mm.

Intertwined points were formed on the first main face and the second main face, and intertwined portions were continuously formed from each intertwined point on the first main face to the corresponding intertwined point on the second main face. The intertwined portions were arranged in multiple lines along the longitudinal direction and the width direction of the mat. In a line of the intertwined portions along the longitudinal direction of the mat, the intertwined portions were formed at substantially uniform intervals. In a line of the intertwined portions along the width direction of the mat, the intertwined portions were formed at substantially uniform intervals. The formation density of the intertwined portions was 7 portions/cm$^2$. The intertwined portions included the first long fibrous substance and the short fibrous substance which were arranged in the direction toward the side of the second main face and which were intertwined with each other.

The minimum distance between one intertwined point and the nearest intertwined point was about 3 mm.

The diameter of each of the intertwined points on the intertwined point on the first main face and the second main face was about 1 mm.

The average fiber lengths of the first long fibrous substance and the short fibrous substance were measured as follows.

First, the produced mat was divided into two layers: the first layer and the second layer.

Next, 10 measurement points on the first layer were arbitrarily selected.

Then, 50 fibers were arbitrarily selected from the first long fibrous substance in the respective measurement points, and the fiber lengths of the 50 fibers selected from the first long fibrous substance were measured with a 10-power optical microscope. These operations were performed with respect to all of the measurement points. Thereby, the fiber lengths of total 500 fibers from the first long fibrous substance were measured, and the average fiber length of the first long fibrous substance was calculated.

The average fiber length of the short fibrous substance was measured in the same manner as the average fiber length of the first long fibrous substance except that the second layer was used instead of the first layer.

(Shear Strength Measurement Test)

Figure 7:
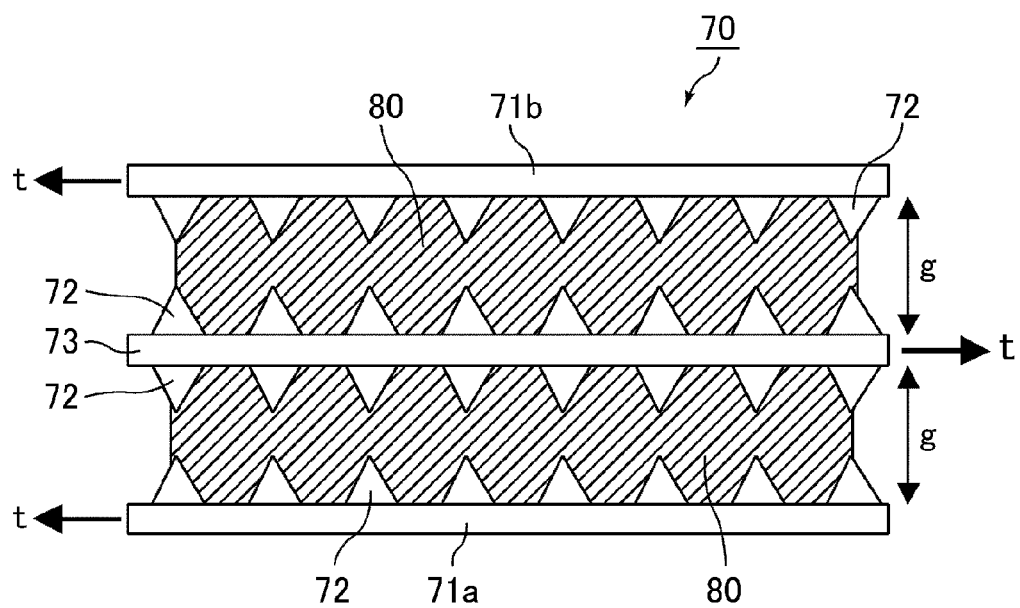
FIG. 7 is a side view schematically showing a shear strength testing apparatus.

A shear strength measurement test was performed with a shear strength tester shown in FIG. 7.

FIG. 7 is a side view schematically showing the shear strength tester.

A shear strength tester 70 shown in FIG. 7 includes two SUS-made plates 71a and 71b (50 mm in length×50 mm in width×3 mm in thickness) each provided with 77 pieces of conical protrusions 72 (1 mm in bottom diameter×1.6 mm in height) on either one main face, and a SUS-made middle plate 73 (50 mm in length×50 mm in width×3 mm in thickness) provided with 77 pieces of conical protrusions 72 (1 mm in bottom diameter×1.6 mm in height) on both of the main faces.

The shear strength was measured as follows with the shear strength tester 70.

First, the produced mat was punched into a size of 50×50 mm in a plan view to provide a sample for shear strength measurement.

A first measurement sample 80 was placed on the main face provided with the protrusions 72 of one of the plate 71a, and the middle plate 73 whose main faces were provided with the protrusions 72 was placed thereon. Thereby, the first measurement sample 80 was sandwiched with a predetermined gap g.

Next, a second measurement sample 80 was placed on the middle plate 73, and the other plate 71b was placed on the second measurement sample 80 with a predetermined gap g.

Thereby, the measurement sample 80 was placed in the respective gaps formed between the three plates; that is, the two samples in total were placed between the plates. Then, these samples were compressed.

At that time, the gaps between the three plates were adjusted so that the compressed samples 80 each had a density of 0.35 g/cm$^3$.

Thereafter, the two plates 71a and 71b and the middle plate 73 were pulled in opposite directions (directions indicated by arrows t in FIG. 7), and the stress (N) generated at that time was measured.

As a result, the shear strength of the produced sample was 183.8 N.

(Density Measurement Test)

The produced mat was punched into a size of 100 mm×100 mm in a plan view to provide a sample for density measurement.

The thickness (mm) of this sample was measured, the volume (cm$^3$) was calculated, and the weight (g) was measured. Thereby, the density (g/cm$^3$) was calculated.

As a result, the density of the produced sample was 0.140 g/cm$^3$.

In the present test, a higher density indicates that the inorganic fibrous substances constituting the mat are more compressed. Further, this indicates that the mat has a lower volume.

(Wrapping Test)

A cylindrical porous ceramic exhaust gas treating body having a size of 127 mm in diameter×150 mm in length in the longitudinal direction was prepared.

A sample for wrapping test having a size of 400 mm in length×100 mm in width in a plan view was prepared through the same method as for producing the mat.

This sample was wrapped around the peripheral portion of the exhaust gas treating body.

At that time, crackings on the sample were visually checked.

As a result, no cracking occurred in the produced sample, and no gap occurred between the exhaust gas treating body and the wrapped sample.

Examples 2 to 4

Except that the average fiber length of the short fibrous substance precursor in the step (2) of Example 1 was changed so that the average fiber length of the short fibrous substance was changed as shown in Table 1 (Example 2: 20 mm, Example 3: 10 mm, Example 4: 5 mm), a mat was produced in the same manner as in Example 1.

Examples 5 to 8

Except that the average fiber length of the first long fibrous substance precursor in the sub-step (1-1) of Example 1 was changed so that the average fiber length of the first long fibrous substance was changed as shown in Table 1 (Example 5: 30 mm, Example 6: 40 mm, Example 7: 80 mm, Example 8: 100 mm), a mat was produced in the same manner as in Example 1.

Examples 9 to 11

Except that the degree of compressing the first long fibrous substance precursor in the sub-step (1-1) of Example 1 and the degree of compressing the short fibrous substance precursor in the step (2) were changed so that the ratio between the thickness of the first layer and the thickness of the second layer was changed as shown in Table 1 (Example 9: 1:5, Example 10:1:1, Example 11: 1:10), a mat was produced in the same manner as in Example 1.

Reference Examples 1 to 3

Except that the average fiber length of the first long fibrous substance, the average fiber length of the short fibrous substance, the thickness of the mat, or the ratio between the thickness of the first layer and the thickness of the second layer was changed as shown in Table 1 in the same manner as in Examples 2 to 11, a mat was produced in the same manner as in Example 1.

The difference between Reference Example 1 and Example 1 was that the average fiber length of the first long fibrous substance was 20 mm and the average fiber length of the short fibrous substance was 10 mm in Reference Example 1, for example. The difference between Reference Example 2 and Example 1 was that the ratio between the thickness of the first layer and the thickness of the second layer was 1:15 in Reference Example 2, for example. The difference between Reference Example 3 and Example 1 was that the ratio between the thickness of the first layer and the thickness of the second layer was 1:0.5 in Reference Example 3, for example.

Comparative Examples 1 and 2

In Comparative Example 1, except that the first long fibrous substance precursor used in the sub-step (1-1) of Example 1 was replaced by a short fibrous substance precursor having an average fiber length of 20 mm so that the first layer and the second layer both were made from the short fibrous substance having an average fiber length of 14 mm, a mat was produced in the same manner as in Example 1.

In Comparative Example 2, except that the short fibrous substance precursor used in the step (2) of Example 1 was replaced by a long fibrous substance precursor having an average fiber length of 100 mm so that the first layer and the second layer both were made from the long fibrous substance having an average fiber length of 70 mm, a mat was produced in the same manner as in Example 1.

Comparative Example 3

Except that the needling was not performed, a mat was produced in the same manner as in Comparative Example 1.

Table 1 shows the main structures of Examples 1 to 11, Reference Examples 1 to 3, and Comparative Examples 1 to 3.

Although not shown in Table 1, the minimum distance between one intertwined point and the nearest intertwined point was about 3 mm in Examples 1 to 11, Reference Examples 1 to 3, and Comparative Examples 1 and 2. Further, the diameter of each of the first intertwined points on the first main face and each of the second intertwined points on the second main face was about 1 mm in Examples 1 to 11, Reference Examples 1 to 3, and Comparative Examples 1 and 2.

TABLE 1

| | Average fiber length of first long fibrous substance (mm) | Average fiber length of short fibrous substance (mm) | Thickness of mat (mm) | Thickness of first layer:thickness of second layer | Presence of intertwined portion(*2) |
|---|---|---|---|---|---|
| Example 1 | 70 | 14 | 10 | 1:3 | Present |
| Example 2 | 70 | 20 | 9.9 | 1:3 | Present |
| Example 3 | 70 | 10 | 10 | 1:3 | Present |
| Example 4 | 70 | 5 | 10.4 | 1:3 | Present |
| Example 5 | 30 | 14 | 12 | 1:3 | Present |
| Example 6 | 40 | 14 | 11.6 | 1:3 | Present |
| Example 7 | 80 | 14 | 9.9 | 1:3 | Present |
| Example 8 | 100 | 14 | 9.9 | 1:3 | Present |
| Example 9 | 70 | 14 | 11.6 | 1:5 | Present |
| Example 10 | 70 | 14 | 9.9 | 1:1 | Present |
| Example 11 | 70 | 14 | 10.9 | 1:10 | Present |
| Reference Example 1 | 20 | 10 | 12.7 | 1:3 | Present |
| Reference Example 2 | 70 | 14 | 10.8 | 1:15 | Present |
| Reference Example 3 | 70 | 14 | 9.0 | 1:0.5 | Present |

TABLE 1-continued

|  | Average fiber length of first long fibrous substance (mm) | Average fiber length of short fibrous substance (mm) | Thickness of mat (mm) | Thickness of first layer:thickness of second layer | Presence of intertwined portion(*2) |
| --- | --- | --- | --- | --- | --- |
| Comparative Example 1 |  | 14(*1) | 13.7 | 1:3 | Present |
| Comparative Example 2 |  | 70(*1) | 8.5 | 1:3 | Present |
| Comparative Example 3 |  | 14(*1) | 20 | 1:3 | Absent |

(*1)The inorganic fibrous substances for the first layer and the second layer each have the same average fiber length.
(*2)In the case that intertwined portions are formed, the formation density of the intertwined portions was 7 pieces/cm$^2$.

With respect to the mats produced in Examples 2 to 11, Reference Examples 1 to 3, and Comparative Examples 1 to 3, the shear strength measurement test, the density measurement test, and wrapping test were performed in the same manner as in Example 1.

Table 2 shows the results in Examples 2 to 11, Reference Examples 1 to 3, and Comparative Examples 1 to 3, as well as the results in Example 1.

TABLE 2

|  | Shear strength (N) (*1) | Density (g/cm$^3$) | Wrapping test |
| --- | --- | --- | --- |
| Example 1 | 183.8 | 0.140 | Good (*2) |
| Example 2 | 187.6 | 0.142 | Good |
| Example 3 | 180.1 | 0.140 | Good |
| Example 4 | 175.9 | 0.135 | Good |
| Example 5 | 152.4 | 0.120 | Good |
| Example 6 | 150.0 | 0.120 | Good |
| Example 7 | 185.7 | 0.142 | Good |
| Example 8 | 193.5 | 0.142 | Good |
| Example 9 | 150.0 | 0.120 | Good |
| Example 10 | 190.3 | 0.141 | Good |
| Example 11 | 170.0 | 0.129 | Good |
| Reference Example 1 | 130.2 | 0.110 | Very fine cracking occurred (*3) |
| Reference Example 2 | 163.2 | 0.130 | Very fine cracking occurred (*3) |
| Reference Example 3 | 190.7 | 0.145 | Slightly poor (*4) |
| Comparative Example 1 | 124.4 | 0.102 | Cracking occurred |
| Comparative Example 2 | 195.7 | 0.145 | Poor (*5) |
| Comparative Example 3 | 100.2 | 0.07 | Cracking occurred |

(*1) The sample was compressed to have a density of 0.35 g/cm$^3$.
(*2) "Good" means that no cracking occurred on the sample upon wrapping and no gap occurred between the wrapped sample and an exhaust gas treating body.
(*3) "Very fine cracking occurred" means that no cracking occurred on the sample upon wrapping and no gap occurred between the wrapped sample and an exhaust gas treating body, but a slit, which may be reduced to a cracking if left standing, occurred on the surface of the sample.
(*4) "Slightly poor" means that no cracking occurred on the sample upon wrapping and no gap occurred between the wrapped sample and an exhaust gas treating body, but some part of the sample was slightly difficult to bend upon wrapping.
(*5) "Poor" means that no cracking occurred on the sample upon wrapping, but a gap occurred between the wrapped sample and an exhaust gas treating body.

As shown in Table 2, the mats produced in Examples 1 to 11 and Reference Examples 1 to 3 each were high in shear strength and high in density (in other words, the volume was appropriately low), the samples were less likely to suffer crackings, and no gap occurred between the respective exhaust gas treating bodies and the samples.

The mat in Reference Example 1 had slightly lower shear strength and density than the mat in Example 1. Further, a very fine slit, which may be reduced to a cracking if left standing, occurred on the surface of the sample in the wrapping test.

This is presumably because the average fiber length of the first long fibrous substance was 20 mm in the mat of Reference Example 1 and the average fiber length of the first long fibrous substance was shorter than twice the thickness of the mat (25.4 mm).

The mat in Reference Example 2 had slightly lower shear strength and density than the mat in Example 1 probably because the mat had the relationship: thickness of first layer:thickness of second layer=1:15. Further, a very fine slit, which may be reduced to a cracking if left standing, occurred on the surface of the sample in the wrapping test.

Probably because the mat in Reference Example 3 had the relationship: thickness of first layer:thickness of second layer=1:0.5, no cracking occurred in the sample; however, some part of the sample was slightly difficult to bend upon wrapping. Nevertheless, such difficulty was not to the extent that the handleability upon wrapping was poor.

The mat in Comparative Example 1 consisted of the short fibrous substance having an average fiber length of 14 mm, and the mat had low shear strength and density. Further, the sample suffered crackings in the wrapping test.

The mat in Comparative Example 2 consisted of the long fibrous substance having an average fiber length of 70 mm. A gap occurred between the exhaust gas treating body and the wrapped sample in the wrapping test, and thus the handleability upon wrapping was poor. In addition, the production cost of the mat was presumably high.

The mat in Comparative Example 3 consisted of the short fibrous substance having an average fiber length of 14 mm. Probably because the mat had no intertwined portion, the mat has extremely low shear strength and density. In addition, the sample suffered crackings in the wrapping test.

(Second Embodiment)

The following will describe the second embodiment, which is one embodiment of the present invention, referring the drawings.

The mat according to the second embodiment of the present invention includes a first main face, a second main face opposite to the first main face, a first layer occupying a certain area from the first main face along a thickness direction of the mat, a second layer adjacent to the first layer, a third layer occupying a certain area from the second main face along a thickness direction of the mat, and an intertwined portion extending from the first main face to the second main face. The first layer includes a first long fibrous substance which includes an inorganic fibrous substance, the second layer includes a short fibrous substance which includes an inorganic fibrous substance and which has an average fiber length shorter than an average fiber length of the first long fibrous substance, and the third layer includes a second long fibrous substance which includes an inorganic fibrous substance and which has an average fiber length longer than the average fiber length of the short fibrous substance. The intertwined portion includes the first long fibrous substance, the short fibrous substance, and the second long fibrous substance which are more closely intertwined with each other than inorganic fibrous substances in a portion except the intertwined portion.

Figure 8A:
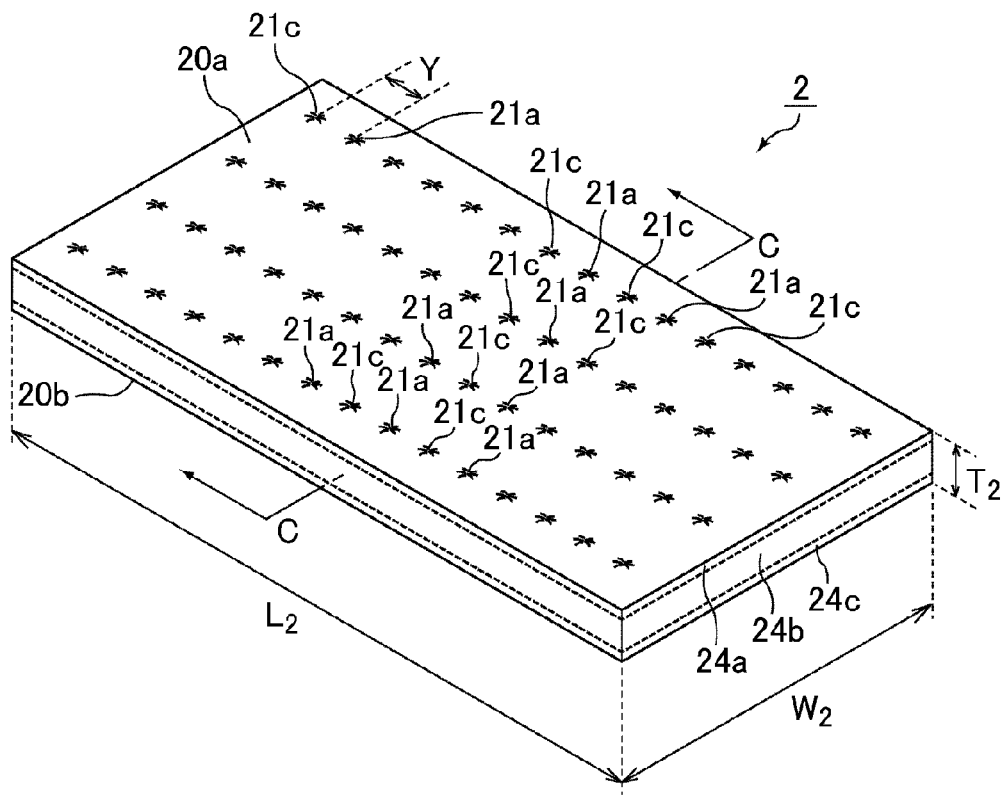
FIG. 8A is a perspective view schematically showing a mat according to the second embodiment of the present invention.
Figure 8B:
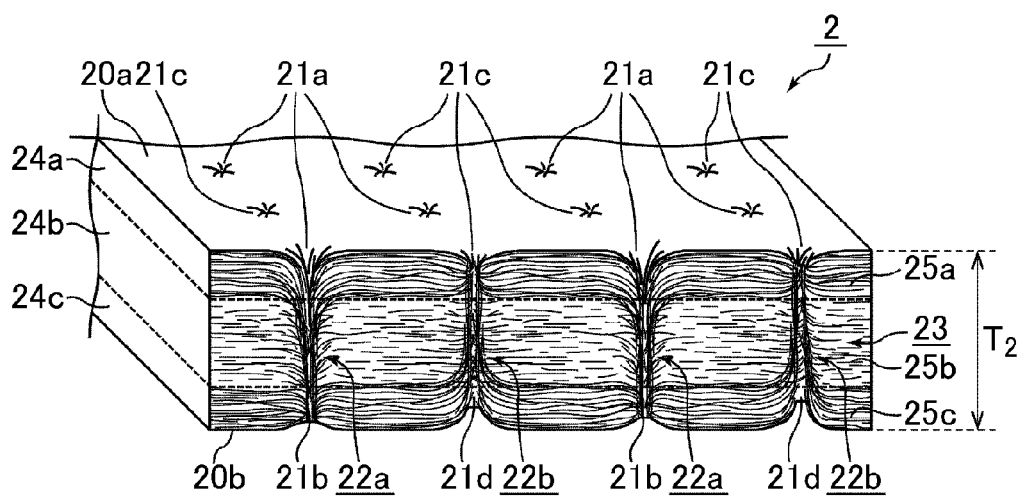
FIG. 8B is a C-C line cross-sectional view of the mat shown in FIG. 8A.

FIG. 8A is a perspective view schematically showing the mat according to the second embodiment of the present invention, and FIG. 8B is a C-C line cross-sectional view of the mat shown in FIG. 8A.

A mat 2 of the present embodiment shown in FIG. 8A and FIG. 8B has a substantially rectangular shape in a plan view with a predetermined length (indicated by a double-headed arrow $L_2$ in FIG. 8A), width (indicated by a double-headed arrow $W_2$ in FIG. 8A), and thickness (indicated by a double-headed arrow $T_2$ in FIG. 8A).

The largest main face of the mat 2 is a first main face 20a, and the main face opposite to the first main face 20a is a second main face 20b.

The mat 2 has a size of from about 100 mm to about 10,000 mm in length×from about 100 mm to about 1,500 mm in width×from about 5 mm to about 30 mm in thickness.

The mat 2 includes three layers: a first layer 24a which has a first main face 20a and which occupies a certain area from the first main face 20a along the thickness direction of the mat 2; a second layer 24b which is adjacent to the first layer 24a; and a third layer 24c which has a second main face 20b, which occupies a certain area from the second main face 20b along the thickness direction of the mat 2, and which is adjacent to the second layer 24b.

The ratio between the sum of the thicknesses of the first layer 24a and the third layer 24c and the thickness of the second layer 24b is preferably from about 1:1 to about 1:5.

The first layer 24a includes a first long fibrous substance 25a. The second layer 24b includes a short fibrous substance 25b having an average fiber length shorter than that of the first long fibrous substance 25a. The third layer 24c includes a second long fibrous substance 25c having an average fiber length longer than that of the short fibrous substance 25b.

The first long fibrous substance 25a, the short fibrous substance 25b, and the second long fibrous substance 25c each are the same as the inorganic fibrous substances (the first long fibrous substance and the short fibrous substance) and have the same composition as those mentioned in the first embodiment of the present invention. The first long fibrous substance 25a, the short fibrous substance 25b, and the second long fibrous substance 25c may have the same composition or may have different compositions.

The average fiber lengths and average fiber diameters of the first long fibrous substance 25a and the second long fibrous substance 25c may be the same as the average fiber length and the average fiber diameter of the first long fibrous substance 15a in the first embodiment of the present invention. The average fiber length and the average fiber diameter of the first long fibrous substance 25a may be the same as or different from the average fiber length and the average fiber diameter of the second long fibrous substance 25c.

The average fiber length and the average fiber diameter of the short fibrous substance 25b may be the same as the average fiber length and the average fiber diameter of the short fibrous substance 15b in the first embodiment of the present invention.

First intertwined points 21a are formed on the first main face 20a, and second intertwined points 21b are formed on the second main face 20b. Further, first intertwined portions 22a are continuously formed between the respective first intertwined points 21a to the corresponding second intertwined points 21b along the thickness direction of the mat 2.

Here, the first intertwined points 21a, the second intertwined points 21b, and the first intertwined portions 22a are formed at the positions where the needles pierce the sheet upon the needling.

The first intertwined portions 22a include the first long fibrous substance 25a, the short fibrous substance 25b, and the second long fibrous substance 25c which are arranged in the direction toward the side of the second main face 20b and which are closely intertwined with each other.

Further, the first long fibrous substance 25a, the short fibrous substance 25b, and the second long fibrous substance 25c closely intertwined with each other around the first intertwined portions 22a cause the mat 2 to be in a state as if it were sewn along the thickness direction.

Third intertwined points 21c are formed on the first main face 20a, and fourth intertwined points 21d are formed on the second main face 20b. Further, second intertwined portions 22b are continuously formed from the respective third intertwined points 21c to the corresponding fourth intertwined points 21d.

Here, the third intertwined points 21c, the fourth intertwined points 21d, and the second intertwined portions 22b are formed at the positions where the needles pierce the sheet upon the needling.

The second intertwined portions 22b include the first long fibrous substance 25a, the short fibrous substance 25b, and the second long fibrous substance 25c which are arranged in the direction toward the side of the first main face 20a and which are closely intertwined with each other.

Further, the first long fibrous substance 25a, the short fibrous substance 25b, and the second long fibrous substance 25c closely intertwined with each other around the second intertwined portions 22b cause the mat 2 to be in a state as if it were sewn along the thickness direction.

On the other hand, a non-formation region 23 other than the first intertwined portions 22a and the second intertwined portions 22b includes inorganic fibrous substances intertwined with each other in a relatively loose manner, and is like a nonwoven fabric.

Therefore, the density of the inorganic fibrous substances in the vicinity of the first intertwined portions 22a and the second intertwined portions 22b is higher than that in the non-formation region 23 where no first intertwined portion 22a or second intertwined portion 22b is formed.

The sum of the formation densities of the first intertwined portions 22a and the second intertwined portions 22b is preferably from about 0.5 portions/cm² to about 30 portions/cm². This is because such a preferable mode causes higher shear strength and an appropriately low volume of the mat 2.

If the sum of the formation densities of the first intertwined portions and the second intertwined portions is not less than about 0.5 portions/cm², the number of the first intertwined portions and the second intertwined portions formed per unit area is not too small. Thus, the shear strength is less likely to be low and the volume is likely to be low.

If the sum of the formation densities of the first intertwined portions and the second intertwined portions is not more than about 30 portions/cm², the number of the first intertwined portions and the second intertwined portions formed per unit area is not too large. Thus, the volume of the mat tends not to be low, and thereby the repulsive force is less likely to be low. Further, a large amount of inorganic fibrous substances in the mat are not finely cut by the needling. Thus, the shear strength of the mat is less likely to be low.

The term "the sum of the formation densities of the first intertwined portions and the second intertwined portions" herein means the sum of the numbers of the first intertwined portions and the second intertwined portions formed on the main cross section per 1 cm² counted as follows: the mat is substantially bisected at the middle point of the thickness direction along the plane substantially parallel to the first main face and the second main face, and the obtained main cross section was observed visually or with a magnifying glass.

The first intertwined portions 22a and the second intertwined portions 22b (the first intertwined points 21a, the second intertwined points 21b, the third intertwined points 21c, and the fourth intertwined points 21d) are formed in multiple lines along the longitudinal direction $L_2$ and the width direction $W_2$ of the mat 2.

In one line along the longitudinal direction $L_2$ of the mat 2, the first intertwined portions 22a (the first intertwined points 21a and the second intertwined points 21b) and the second intertwined portions 22b (the third intertwined points 21c and the fourth intertwined points 21d) are alternately formed with each other at substantially uniform intervals. Further, in one line along the width direction $W_2$ of the mat 2, the first intertwined portions 22a and the second intertwined portions 22b are alternately formed with each other at substantially uniform intervals which are different from the above intervals.

Preferably, the first intertwined portions 22a and the second intertwined portions 22b are alternately formed with each other at different positions; however, one first intertwined portion 22a and another first intertwined portion 22a may be adjacent to each other, or one second intertwined portion 22b and another second intertwined portion 22b may be adjacent to each other.

The minimum distance (distance indicated by a double-headed arrow Y in FIG. 8A) between one first intertwined point 21a (one second intertwined point 21b) and a third intertwined point 21c nearest to the one first intertwined point 21a (a fourth intertwined point 21d nearest to the one second intertwined point 21b) (hereinafter, also referred to as the nearest third intertwined point 21b (the nearest fourth intertwined point 21d)) is preferably from about 1 mm to about 10 mm. This is because, in such a preferable mode, the first intertwined portions 22a and the second intertwined portions 22b are not so densely formed, resulting in sufficiently high shear strength and appropriately low volume of the mat 2.

If the minimum distance between one first intertwined point (second intertwined point) and the nearest third intertwined point (fourth intertwined point) is greater than about 10 mm, the number of the first intertwined portions and the second intertwined portions formed per unit area is too small. Thus, the shear strength is likely to be low and the volume is less likely to be low.

If the minimum distance is less than about 1 mm, the number of the first intertwined portions and the second intertwined portions formed per unit area is too large. Thus, the volume of the mat is likely to be low and the repulsive force thereof is likely to be low.

Further, the mat includes a large amount of the inorganic fibrous substances finely cut in the needling. Thus, the shear strength of the mat is likely to be low.

The diameter of each of the first intertwined points 21a, the second intertwined points 21b, third intertwined points 21c, and the fourth intertwined points 21d is preferably from about 0.1 mm to about 2 mm.

This is because the diameter of each of the first intertwined points 21a, the second intertwined points 21b, the third intertwined points 21c, and the fourth intertwined points 21d are not so large, and the shear strength of the mat 2 is sufficiently high.

If the diameter of each of the first intertwined points, the second intertwined points, the third intertwined points, and the fourth intertwined points is not greater than about 2 mm, the inorganic fibrous substances in the first intertwined points, the second intertwined points, the first intertwined portions, the third intertwined points, the fourth intertwined points, and the second intertwined portions tend not to be in a coarse state, so that the shear strength of the mat is less likely to be low.

If the diameter of each of the first intertwined points, the second intertwined points, the third intertwined points, and the fourth intertwined points is not smaller than about 0.1 mm, the first long fibrous substance, the short fibrous substance, and the second long fibrous substance tend to be sufficiently intertwined with each other in the first intertwined portions and the second intertwined portions. Thus, the shear strength of the mat is less likely to be low and the volume thereof is likely to be sufficiently low.

The weight of the mat 2 (weight per unit area) is preferably from about 900 g/m² to about 3,000 g/m².

The weight of the mat 2 is more preferably from about 1,500 g/m² to about 2,800 g/m².

The density of the mat 2 is preferably from about 0.08 g/m³ to about 0.20 g/cm³.

The density of the mat 2 is more preferably from about 0.10 g/m³ to about 0.15 g/cm³.

Except that the aforementioned mat of the present embodiment is used, the holding sealing material of the present embodiment has the same structure as the holding sealing material according to the first embodiment of the present invention. Thus, the description thereof is omitted.

Except that the holding sealing material including the aforementioned mat of the present embodiment is used, the exhaust gas purifying apparatus of the present embodiment has the same structure as the exhaust gas purifying apparatus according to the first embodiment of the present invention. Thus, the description is omitted.

The mat of the present embodiment is produced through the following steps.

First, a first sub-sheet including a first long fibrous substance precursor is produced through the same step as the first sub-sheet producing step (1) in the first embodiment of the present invention.

Similarly, a third sub-sheet including a second long fibrous substance precursor is produced.

Separately, a second sub-sheet including a short fibrous substance precursor is produced through the same step as the second sub-sheet producing step (2) in the first embodiment of the present invention.

In order to adjust the ratio between the sum of the thicknesses of the first sub-sheet and the third sub-sheet and the thickness of the second sub-sheet to from about 1:1 to about 1:5, the amount of the short fibrous substance precursor may be reduced or the degree of compressing the short fibrous substance precursor may be changed so that the thickness of the second sub-sheet is adjusted.

Next, the first sub-sheet, the second sub-sheet, and the third sub-sheet are laminated such that the second main face of the first sub-sheet and the first main face of the second sub-sheet are in contact with each other and the second main face of the second sub-sheet and the first main face of the third sub-sheet are in contact with each other.

Thereby, a sheet including three sub-sheets is produced. The three sub-sheets include a first sub-sheet which occupies a certain area from the first main face along the thickness direction of the sheet, a second sub-sheet which is adjacent to the first sub-sheet, and a third sub-sheet which occupies a certain area from the second main face along the thickness direction of the sheet.

The ratio between the sum of the thicknesses of the first sub-sheet and the third sub-sheet and the thickness of the second sub-sheet in the sheet produced through the following steps is preferably from about 1:1 to about 1:5.

Thereafter, the needling was performed using a needling apparatus.

The needling apparatus may be a needling apparatus having substantially the same structure as shown in FIG. 2A.

In order to produce a mat wherein the sum of the formation densities of the first intertwined portions and the second intertwined portions is from about 0.5 portions/cm$^2$ to about 30 portions/cm$^2$, the minimum distance between one first intertwined point (one second intertwined point) and the nearest third intertwined point (nearest fourth intertwined point) is from about 1 mm to about 10 mm, and the diameter of each of the first intertwined points and the second intertwined points is from about 0.1 mm to about 2 mm, a needle plate may be provided with a predetermined number of needles (needles each having a predetermined diameter) per unit area of the opposite face of the needle plate at predetermined intervals.

Specifically, the needling is performed as follows.

First, the produced sheet was placed on a mounting face of a supporting plate such that the mounting face and the second main face of the sheet (lower main face) are in contact with each other. Then, the needle plate above the supporting plate and the sheet was moved down along the thickness of the sheet, and the needles are passed through the sheet from the first main face (upper main face) to the second main face. Thereafter, the needles are extracted from the sheet. Thereby, the first needling is completed.

The positions where the needles pierce on the first main face are to be first intertwined points on the first main face of the mat to be produced through the following steps; the positions where the needles pierce on the second main face are to be second intertwined points on the second main face of the mat; and the positions where the needles pierce are to be first intertwined portions of the mat.

Next, the first main face and the second main face of the sheet after the first needling are turned upside down. In other words, the sheet is placed such that the mounting face of the supporting plate and the first main face are in contact with each other.

Then, the needle plate above the supporting plate and the sheet is moved down along the thickness direction of the sheet, and thereby the needles are passed through the sheet from the second main face to the first main face. At this time, the needles are passed through the sheet such that the positions where the needles pierce in the first needling and the positions where the needles pierce in the second needling are alternately disposed.

Thereafter, the needles are extracted from the sheet. Thereby, the second needling is completed.

A needled sheet is produced through the two needling steps.

The positions where the needles pierce on the first main face are to be third intertwined points formed on the first main face of the mat to be produced through the following steps; the positions where the needles pierce on the second main face are to be fourth intertwined points formed on the second main face of the mat; and the positions where the needles pierce are to be second intertwined portions of the mat.

Alternatively, a needling apparatus including two opposite needle plates and a supporting plate for a sheet therebetween may be prepared, and the needles may be substantially simultaneously passed through the sheet from both the main faces to perform the needling on both of the main faces of the sheet. The needled sheet may be produced by this method.

Subsequently, the needled sheet is fired at a maximum temperature of from about 1,000° C. to about 1,600° C. so that the first long fibrous substance precursor is converted into the first long fibrous substance, the short fibrous substance precursor is converted into the short fibrous substance, and the second long fibrous substance precursor is converted into the second long fibrous substance. Thereby, the mat of the present embodiment is produced.

In the case of producing a holding sealing material including the produced mat, the produced mat may be subjected to the step (6) mentioned in the first embodiment of the present invention.

In the case of producing an exhaust gas purifying apparatus including the produced holding sealing material, the produced holding sealing material may be subjected to the step (7) mentioned in the first embodiment of the present invention.

The mat, the method for producing a mat, and the exhaust gas purifying apparatus according to the second embodiment of the present invention can also show the effects (4), (5), and (6) mentioned in the first embodiment of the present invention.

Further, they show the following effects (7) to (9).

(7) The mat of the present embodiment has the first intertwined portions each continuously formed from a first intertwined point to the corresponding second intertwined point along the thickness direction of the mat. Further, the mat has the second intertwined portions each continuously formed from a third intertwined point to the corresponding fourth intertwined point along the thickness direction of the mat.

The arranged direction of the first long fibrous substance, the short fibrous substance, and the second long fibrous substance in the first intertwined portions and the arranged direction of the first long fibrous substance, the short fibrous substance, and the second long fibrous substance in the second intertwined portion are opposite to each other, and the inorganic fibrous substances are more complexly intertwined around the first intertwined portions and the second intertwined portions.

Thus, the shear strength of the mat tends to be high and the volume of the mat tends to be appropriately low.

Therefore, in the case of producing an exhaust gas purifying apparatus using a holding sealing material including such a mat, the holding sealing material is less likely to be damaged and the durability thereof tends to be improved. Further, the exhaust gas treating body wrapped with the holding sealing material is likely to be easily stuffed into a casing.

Since the first layer includes the first long fibrous substance and the third layer includes the second long fibrous substance, and thus the mat does not consist of the short fibrous substance, the flexibility of the mat tends to be high.

Therefore, the holding sealing material is less likely to suffer crackings when the holding sealing material including such a mat is wrapped around the exhaust gas treating body.

Since the second layer includes the short fibrous substance which has a short average fiber length and which is less likely to form a high-density portion, variations in the density of the inorganic fibrous substances are leveled off and tend to be kept low in the whole mat even though the first layer includes the first long fibrous substance which has a long average fiber length and which is likely to form a high-density portion and the third layer includes the second long fibrous substance which is likely to form a high-density portion. Therefore, the mat of the present embodiment is likely to be bent uniformly, and the holding sealing material including the mat is excellent in handleability upon wrapping and is less likely to suffer creases upon stuffing.

Since the second layer includes the short fibrous substance produced at low cost and the inorganic fibrous substances constituting the mat does not consist of the first long fibrous substance and the second long fibrous substance which are produced at high cost, the production cost of the mat tends to be low.

(8) In the case that the average fiber lengths of the first long fibrous substance and the second long fibrous substance each are about two or more times as long as the thickness of the mat, the first long fibrous substance in the first intertwined portions presumably reaches the second main face from the first main face. Particularly in the case that the average fiber length of the first long fibrous substance is longer than about twice the thickness of the mat, most part of the first long fibrous substance reaching the second main face from the first main face is presumably folded back at the second main face so that it is more complexly intertwined with the short fibrous substance and the second long fibrous substance. In addition, the second long fibrous substance in the second intertwined portions presumably reaches the first main face from the second main face. Particularly in the case that the average fiber length of the second long fibrous substance is longer than about twice the thickness of the mat, most part of the second long fibrous substance reaching the first main face from the second main face is presumably folded back at the first main face so that it is more complexly intertwined with the short fibrous substance and the first long fibrous substance.

In the case that the average fiber lengths of the first long fibrous substance and the second long fibrous substance each are not shorter than about 20 mm and not longer than about 100 mm and the average fiber length of the short fibrous substance is not shorter than about 3.5 mm and not longer than about 20 mm, the average fiber lengths of the first long fibrous substance and the second long fibrous substance and the average fiber length of the short fibrous substance show good balance. Thus, the first long fibrous substance, the short fibrous substance, and the second long fibrous substance are intertwined with each other at a better degree around the first intertwined portions and the second intertwined portions and the shear strength tends to be higher. In addition, the first long fibrous substance, the short fibrous substance, and the second long fibrous substance more complexly intertwined with each other around the first intertwined portions and the second intertwined portions cause the mat to be in a state as if it were securely sewn along the thickness direction. Thus, the volume of the mat tends to be sufficiently low. Furthermore, the average fiber lengths of the first long fibrous substance and the second long fibrous substance are sufficiently long, and thus good flexibility tends to be secured.

In the case that the average fiber length is not shorter than about 3.5 mm and not longer than about 20 mm, the short fibrous substance is less likely to form a high-density portion, and thus the density of the inorganic fibrous substances is made equal in the whole mat. Therefore, the holding sealing material including this mat is excellent in handleability upon wrapping and is less likely to suffer creases upon stuffing.

In general, the short fibrous substance having the aforementioned average fiber length is produced at sufficiently lower cost than the first long fibrous substance and the second long fibrous substance, in many cases. Thus, the production cost of the mat tends to be sufficiently low.

(9) In the case that the ratio between the sum of the thicknesses of the first layer and the third layer and the thickness of the second layer is from about 1:1 to about 1:5, the amounts of the first long fibrous substance and the second long fibrous substance are not too small. Thus, the shear strength of the mat tends to be high, the volume of the mat tends to be appropriately low, and good flexibility tends to be securely achieved.

Further, the amount of the short fibrous substance is not too small. Thus, the density of the inorganic fibrous substances tends to be less varied in the whole mat.

In addition, the amounts of the first long fibrous substance and the second long fibrous substance used in the whole mat each are kept at the necessity minimum. Thus, the production cost tends to be lower.

(Other Embodiments)

The mat according to the embodiments of the present invention may further include an organic binder.

In the case that an exhaust gas purifying apparatus includes a holding sealing material including an organic binder-containing mat (hereinafter, also referred to simply as a binder mat), the organic binder is decomposed by high-temperature exhaust gas and the inorganic fibrous substances are debonded, so that the holding sealing material expands when such an exhaust gas purifying apparatus is used. Thus, high holding force tends to be achieved.

Examples of the organic binder include water-soluble organic polymers such as acryl resin, rubbers e.g. acryl rubber, carboxymethyl cellulose, and polyvinyl alcohol, thermoplastic resins such as styrene resin, and thermosetting resins such as epoxy resin. Particularly preferable among these are acryl rubber, acrylonitrile-butadiene rubber, and styrene-butadiene rubber.

The total amount of the organic binder in the whole binder mat is preferably from about 0.5% by weight to about 20% by weight in the weight of the whole binder mat. This is because an organic binder in such an amount tends to more strongly bond the inorganic fibrous substances constituting the binder mat, and thus tends to increase the strength of the binder mat. In addition, an organic binder in such an amount tends to cause the volume of the binder mat to be appropriately low.

If the total amount of the organic binder in the whole binder mat is not less than about 0.5% by weight in the weight of the whole binder mat, the amount of the organic binder is not so small that the inorganic fibrous substances is less likely to be scattered, and thus the strength of the binder mat is less likely to be low.

If the total amount of the organic binder in the whole binder mat is not more than about 20% by weight in the weight of the whole binder mat, in the case that an exhaust gas purifying apparatus includes a holding sealing material including the binder mat, the amount of organic components in discharged exhaust gas tends not to be large when such an exhaust gas purifying apparatus is used. Thus, the environment is less likely to be much affected.

The binder mat may be produced through the following steps (A) to (C).

(A) Impregnating Step

First, an organic binder solution containing an organic binder is prepared. The whole mat produced by the firing step is uniformly impregnated in the solution by a technique such as flow coating to provide an impregnated mat.

Here, the organic binder solution may be prepared by dissolving the organic binder into a solvent such as water or an organic solvent, or dispersing the organic binder in a dispersion medium such as water.

Preferably, the concentration of the organic binder solution is appropriately adjusted such that the total amount of the organic binder in the whole binder mat to be produced through the following steps is from about 0.5% by weight to about 20% by weight in the weight of the whole binder mat.

(B) Sucking Step

Next, excessive organic binder solution is suction-removed from the impregnated mat with a device such as a suction apparatus.

The sucking step is not necessarily performed. If the impregnated mat contains a small amount of the organic binder solution, for example, the obtained impregnated mat may be subjected to the following drying step directly after the impregnating step.

(C) Drying Step

Thereafter, the solvent and the like in the organic binder solution remaining in the impregnated mat is volatilized with an apparatus such as a heat-air drier while the impregnated mat is compressed.

Thereby, the binder mat is produced.

The mat according to the embodiments of the present invention may further include an expandable material.

In the case that an exhaust gas purifying apparatus includes a holding sealing material including an expandable material-containing mat, the expandable material expands due to high-temperature exhaust gas when the exhaust gas purifying apparatus is used. Thus, the mat tends to show high holding force.

Examples of the expandable material include expandable vermiculite, bentonite, and expandable graphite.

In the mat according to the embodiments of the present invention, the average fiber length of the first long fibrous substance is preferably about two or more times as long as the thickness of the mat.

More preferably, the average fiber length of the first long fibrous substance is not shorter than about 20 mm and not longer than about 100 mm, and the average fiber length of the short fibrous substance is not shorter than about 3.5 mm and not longer than about 20 mm. Further preferably, the average fiber length of the first long fibrous substance is not shorter than about 40 mm and not longer than about 100 mm, and the average fiber length of the short fibrous substance is not shorter than about 5 mm and not longer than about 20 mm. Particularly preferably, the average fiber length of the first long fibrous substance is not shorter than about 70 mm and not longer than about 100 mm, and the average fiber length of the short fibrous substance is not shorter than about 14 mm and not longer than about 20 mm.

This is because, in such preferable modes, the average fiber length of the first long fibrous substance and the average fiber length of the short fibrous substance are in good balance. Further, the first long fibrous substance and the short fibrous substance are more complexly intertwined with each other around the intertwined portions, likely resulting in higher shear strength, appropriately low volume, and good flexibility.

In addition, the density of the inorganic fibrous substances tends to be less varied in the whole mat, and the production cost of the mat tends to be sufficiently low.

As mentioned in the second embodiment of the present invention, the intertwined portions each preferably include the first intertwined portions and the second intertwined portions in the mat according to the embodiments of the present invention. The first intertwined portions include the first long fibrous substance, the short fibrous substance, and the second long fibrous substance which are preferably arranged in the direction toward the side of the second main face and which are closely intertwined with each other. The second intertwined portions include the first long fibrous substance, the short fibrous substance, and the second long fibrous substance which are preferably arranged in the direction toward the side of the first main face and which are closely intertwined with each other. This is because, in such a preferable mode, the arranged direction of the first long fibrous substance, the short fibrous substance, and the second long fibrous substance in the first intertwined portions and the arranged direction of the first long fibrous substance, the short fibrous substance, and the second long fibrous substance in the second intertwined portions are opposite to each other, so that the inorganic fibrous substances are more complexly intertwined with each other around the first intertwined portions and the second intertwined portions.

Even if the arranged direction of the inorganic fibrous substances in the first intertwined portions and the arranged direction of the inorganic fibrous substances in the second intertwined portions are in the same direction, however, the inorganic fibrous substances are intertwined with each other around the first intertwined portions and the second intertwined portions, as mentioned in the first embodiment of the mat according to the present invention.

In the mat according to the embodiments of the present invention, the average fiber lengths of the first long fibrous substance and the second long fibrous substance each are preferably about two or more times as long as the thickness of the mat.

More preferably, the average fiber lengths of the first long fibrous substance and the second long fibrous substance each are not shorter than about 20 mm and not longer than about 100 mm, and the average fiber length of the short fibrous substance is not shorter than about 3.5 mm and not longer than about 20 mm. Further preferably, the average fiber lengths of the first long fibrous substance and the second long fibrous substance each are not shorter than about 40 mm and not longer than about 100 mm, and the average fiber length of the short fibrous substance is not shorter than about 5 mm and not longer than about 20 mm. Particularly preferably, the average fiber lengths of the first long fibrous substance and the second long fibrous substance each are not shorter than about 70 mm and not longer than about 100 mm, and the average fiber length of the short fibrous substance is not shorter than about 14 mm and not longer than about 20 mm.

This is because, in such a preferable mode, the average fiber lengths of the first long fibrous substance and the second long fibrous substance and the average fiber length of the short fibrous substance are in good balance. Further, the first long fibrous substance, the second long fibrous substance, and the short fibrous substance are more complexly intertwined with each other around the intertwined portions, likely resulting in higher shear strength, appropriately low volume, and good flexibility. In addition, the density of the inorganic fibrous substances is less varied in the whole mat, and thereby the production cost of the mat tends to be sufficiently low.

In the mat according to the embodiments of the present invention, the ratio between the thickness of the first layer and the thickness of the second layer is preferably from about 1:1 to about 1:10, more preferably from about 1:2 to about 1:8, and further preferably from about 1:3 to about 1:8.

In the case that the ratio between the thickness of the first layer and the thickness of the second layer is from about 1:1 to about 1:10, the amount of the first long fibrous substance used in the whole mat is kept at the necessity minimum and the production cost tends to be securely lowered. Further, the amount of the first long fibrous substance used in the whole mat is not too small, securely likely resulting in high shear strength, an appropriately low volume, and good flexibility of the mat.

In the mat according to the embodiments of the present invention, the ratio between the sum of the thicknesses of the first layer and the third layer and the thickness of the second layer is preferably from about 1:1 to about 1:5, more preferably from about 1:2 to about 1:5, and particularly preferably from about 1:3 to about 1:5.

In the case that the ratio between the sum of the thicknesses of the first layer and the third layer and the thickness of the second layer is from about 1:1 to about 1:5, the amounts of the first long fibrous substance and the second long fibrous substance used in the whole mat are kept at the necessity minimums and the production cost tends to be securely lowered. Further, the amounts of the first long fibrous substance and the second long fibrous substance used in the whole mat are not too small, securely likely resulting in high shear strength, an appropriately low volume, and good flexibility of the mat.

In the method for producing a mat according to the embodiments of the present invention, the second sub-sheet including the short fibrous substance precursor is used.

Instead of this second sub-sheet, a sheet which has a first main face and a second main face and which includes a short fibrous substance having an average fiber length shorter than that of the first long fibrous substance precursor (the first long fibrous substance precursor and the second long fibrous substance precursor) may be used. The mat according to the embodiments of the present invention can be also produced using a sheet including the short fibrous substance as the second sub-sheet.

The sheet including the short fibrous substance may be produced by firing the second sub-sheet including the short fibrous substance precursor used in the method for producing a mat according to the embodiments of the present invention, or may be produced utilizing centrifugation.

In the case of centrifugation, the sheet may be produced as follows. A rotatable cylindrical body having a large number of small holes on the surrounding wall is prepared. This cylindrical body is rotated at high speed while being heated, and a fused material such as fused silica or fused alumina is supplied into the cylindrical body. The fused material supplied is emitted outside the body through the holes due to centrifugal force. The emitted fused material is heated by a burner disposed around the cylindrical body, and thereby extended. The extended fibrous fused material was cooled down to provide a short fibrous substance. The produced short fibrous substance is compressed, and thereby the sheet including the short fibrous substance is produced.

The inorganic fibrous substance constituting the sheet including the short fibrous substance may be an inorganic fibrous substance having the same structures (e.g. type, composition, average fiber length, and average fiber diameter) as the aforementioned inorganic fibrous substances constituting the mat according to the embodiments of the present invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mat comprising:
   a first main face;
   a second main face opposite to the first main face;
   at least three layers comprising:
      a first layer occupying a first area from the first main face along a thickness direction of the mat, the first layer comprising a first long fibrous substance which comprises an inorganic fibrous substance;
      a second layer adjacent to the first layer, the second layer comprising a short fibrous substance which comprises an inorganic fibrous substance and which has an average fiber length shorter than an average fiber length of the first long fibrous substance; and
      a third layer occupying a third area from the second main face along the thickness direction of the mat, the third layer comprising a second long fibrous substance which comprises an inorganic fibrous substance and which has an average fiber length longer than the average fiber length of the short fibrous substance; and
   an intertwined portion extending from the first main face to the second main face, the intertwined portion comprising the first long fibrous substance, the short fibrous substance, and the second long fibrous substance which are more closely intertwined with each other than the inorganic fibrous substances in a portion except the intertwined portion.

2. The mat according to claim 1,
   wherein
   the average fiber length of the first long fibrous substance is about two or more times as long as a thickness of the mat.

3. The mat according to claim 1,
   wherein
   the average fiber length of the first long fibrous substance is not shorter than about 20 mm and not longer than about 100 mm, and the average fiber length of the short fibrous substance is not shorter than about 3.5 mm and not longer than about 20 mm.

4. The mat according to claim 1,
   wherein
   a ratio between a thickness of the first layer and a thickness of the second layer is about 1:1 to about 1:10.

5. The mat according to claim 1,
   wherein
   the intertwined portion includes a first intertwined portion and a second intertwined portion,
   the first intertwined portion comprises the first long fibrous substance, the short fibrous substance, and the second long fibrous substance which are arranged in a direction from the first main face to the second main face and which are intertwined with each other, and
   the second intertwined portion comprises the first long fibrous substance, the short fibrous substance, and the second long fibrous substance which are arranged in a direction from the second main face to the first main face and which are intertwined with each other.

6. The mat according to claim 1,
   wherein
   the average fiber length of the first long fibrous substance and the average fiber length of the second long fibrous substance each are about two or more times as long as the thickness of the mat.

7. The mat according to claim 1,
   wherein
   the average fiber length of the first long fibrous substance is not shorter than about 20 mm and not longer than about 100 mm,
   the average fiber length of the short fibrous substance is not shorter than about 3.5 mm and not longer than about 20 mm, and
   the average fiber length of the second long fibrous substance is not shorter than about 20 mm and not longer than about 100 mm.

8. The mat according to claim 1, wherein
a ratio between a sum of thicknesses of the first layer and the third layer and a thickness of the second layer is from about 1:1 to about 1:5.

9. The mat according to claim 1, wherein
each of the inorganic fibrous substances comprises at least one of fibrous alumina, fibrous alumina-silica, fibrous silica, soluble fibrous matter, and fibrous glass.

10. The mat according to claim 1, wherein
the inorganic fibrous substances each have an average fiber diameter of from about 3 μm to about 10 μm.

11. The mat according to claim 1, wherein
the intertwined portions are formed at a formation density of from about 0.5 portions/cm$^2$ to about 30 portions/cm$^2$.

12. An exhaust gas purifying apparatus, comprising:
an exhaust gas treating body;
a casing which accommodates the exhaust gas treating body;
a holding sealing material which is disposed between the exhaust gas treating body and the casing and which holds the exhaust gas treating body, the holding sealing material comprising a mat; and
the mat comprising:
a first main face;
a second main face opposite to the first main face;
at least two layers comprising:
a first layer occupying a first area from the first main face along a thickness direction of the mat, the first layer comprising a first long fibrous substance which comprises an inorganic fibrous substance; and
a second layer adjacent to the first layer, the second layer comprising a short fibrous substance which comprises an inorganic fibrous substance and which has an average fiber length shorter than an average fiber length of the first long fibrous substance; and
an intertwined portion extending from the first main face to the second main face, the intertwined portion comprising the first long fibrous substance and the short fibrous substance being more closely intertwined with each other than the inorganic fibrous substances in a portion except the intertwined portion.

\* \* \* \* \*